US012773812B2

(12) United States Patent
Martens et al.

(10) Patent No.: US 12,773,812 B2
(45) **Date of Patent: *Oct. 27, 2026**

(54) GOLF CLUB HEAD HAVING MULTI-MATERIAL FACE AND METHOD OF MANUFACTURE

(71) Applicant: Acushnet Company, Fairhaven, MA (US)

(72) Inventors: Grant M. Martens, San Diego, CA (US); Uday V. Deshmukh, Carlsbad, CA (US)

(73) Assignee: Acushnet Company, Fairhaven, MA (US)

( * ) Notice: Subject to any disclaimer, the term of this patent is extended or adjusted under 35 U.S.C. 154(b) by 378 days.

This patent is subject to a terminal disclaimer.

(21) Appl. No.: 17/982,295

(22) Filed: Nov. 7, 2022

(65) Prior Publication Data

US 2023/0055816 A1 Feb. 23, 2023

Related U.S. Application Data

(63) Continuation of application No. 17/186,791, filed on Feb. 26, 2021, now Pat. No. 11,511,464, which is a (Continued)

(51) Int. Cl.
*A63B 53/04* (2015.01)
*A63B 60/00* (2015.01)
(Continued)

(52) U.S. Cl.
CPC ............ *B29C 43/102* (2013.01); *A63B 53/04* (2013.01); *A63B 53/0466* (2013.01);
(Continued)

(58) Field of Classification Search
CPC ....... B29C 43/012; A63B 53/04; A63B 60/00; A63B 53/0466; A63B 53/0462;
(Continued)

(56) References Cited

U.S. PATENT DOCUMENTS 700,946 A 5/1902 Kempshall
819,900 A 5/1906 Martin
(Continued)

FOREIGN PATENT DOCUMENTS

JP H05-7261 2/1993

OTHER PUBLICATIONS

The Royal and Ancient Golf Club of St. Andrews and USGA, Technical Description of the Pendulum Test, Revised Version, Nov. 2003.

(Continued)

*Primary Examiner* — Sebastiano Passaniti
(74) *Attorney, Agent, or Firm* — Ryan A. Reis

(57) ABSTRACT

A golf club with a multi-material face is disclosed herein. More specifically, the golf club head in accordance with the present invention has a multi-material striking face portion that is made out of a backing layer having a frontal pocket, made out of titanium, and an insert, made out of a composite material, adapted to be inserted into the frontal pocket. The frontal pocket and the insert could have complementary dovetail shaped undercut features to create a mechanical bond between these two components.

7 Claims, 23 Drawing Sheets

Related U.S. Application Data continuation of application No. 17/098,227, filed on Nov. 13, 2020, now Pat. No. 11,186,016, which is a continuation-in-part of application No. 16/453,095, filed on Jun. 26, 2019, now Pat. No. 10,940,617, which is a continuation of application No. 14/581,090, filed on Dec. 23, 2014, now Pat. No. 10,357,901, which is a continuation-in-part of application No. 14/070,311, filed on Nov. 1, 2013, now Pat. No. 9,192,826, which is a continuation-in-part of application No. 13/326,967, filed on Dec. 15, 2011, now Pat. No. 8,876,629, which is a continuation-in-part of application No. 12/832,461, filed on Jul. 8, 2010, now Pat. No. 8,221,261.

(51) Int. Cl.
*B29C 43/10* (2006.01)
*B29L 31/52* (2006.01)
*B29L 9/00* (2006.01)

(52) U.S. Cl.
CPC ............ *A63B 60/00* (2015.10); *A63B 53/042* (2020.08); *A63B 53/0429* (2020.08); *A63B 53/0433* (2020.08); *A63B 53/0437* (2020.08); *A63B 53/0458* (2020.08); *A63B 53/0462* (2020.08); *A63B 2209/02* (2013.01); *A63B 2209/023* (2013.01); *B29L 2009/00* (2013.01); *B29L 2031/5227* (2013.01)

(58) Field of Classification Search
CPC ............ A63B 2209/023; A63B 53/042; A63B 53/0429; A63B 53/0433; A63B 53/0437; A63B 53/0458; A63B 2209/02; B29L 2009/00; B29L 2031/5227
USPC .................................. 473/324–350, 287–292
See application file for complete search history.

(56) References Cited

U.S. PATENT DOCUMENTS 1,562,956 A 11/1925 Guerne
4,229,550 A 10/1980 Jones et al.
4,448,941 A 5/1984 Cheung et al.
4,681,322 A 7/1987 Straza et al.
5,058,895 A 10/1991 Igarashi
5,079,196 A * 1/1992 Arfsten ................ C03C 14/002 428/113
5,106,094 A 4/1992 Desbiolles et al.
5,132,178 A 7/1992 Chyung et al.
5,163,682 A 11/1992 Schmidt et al.
5,238,529 A 8/1993 Douglas
5,268,225 A * 12/1993 Isayev .................... B32B 27/08 264/108
5,303,922 A 4/1994 Lo
5,310,185 A 5/1994 Viollaz et al.
5,316,298 A 5/1994 Hutin et al.
5,328,176 A 7/1994 Lo
5,346,216 A 9/1994 Aizawa
5,358,249 A 10/1994 Mendralla
5,362,055 A 11/1994 Rennie
5,377,986 A * 1/1995 Viollaz ............. A63B 53/0466 473/330
5,403,007 A 4/1995 Chen
5,405,136 A 4/1995 Hardman
5,425,538 A 6/1995 Vincent et al.
5,431,396 A 7/1995 Shieh
5,433,440 A 7/1995 Lin
5,447,311 A 9/1995 Viollaz et al.
5,524,331 A 6/1996 Pond
5,654,059 A * 8/1997 Hecht .................. F16D 69/026 428/218
5,720,673 A 2/1998 Anderson
5,743,813 A 4/1998 Chen et al.
5,766,094 A 6/1998 Mahaffey et al.
5,827,131 A 10/1998 Mahaffey et al.
5,863,261 A 1/1999 Eggiman
5,967,903 A 10/1999 Cheng
6,012,989 A 1/2000 Saksun
6,074,309 A 6/2000 Mahaffey
6,238,300 B1 5/2001 Igarashi
6,238,302 B1 5/2001 Helmstetter et al.
6,248,025 B1 6/2001 Murphy et al.
6,354,962 B1 3/2002 Galloway et al.
6,364,789 B1 4/2002 Kosmatka
6,406,378 B1 * 6/2002 Murphy ................ B29C 70/865 473/224
6,440,008 B2 8/2002 Murphy et al.
6,533,681 B2 3/2003 Inoue et al.
6,605,007 B1 8/2003 Bissonnette et al.
6,612,938 B2 9/2003 Murphy et al.
6,617,013 B2 9/2003 Morrison et al.
6,623,543 B1 9/2003 Zeller et al.
6,638,179 B2 10/2003 Yoshida
6,638,180 B2 10/2003 Tsurumaki
6,648,774 B1 11/2003 Lee
6,672,975 B1 1/2004 Galloway
6,780,124 B2 8/2004 Lu
6,837,094 B2 1/2005 Pringle et al.
6,945,876 B2 9/2005 Nakahara et al.
6,949,032 B2 9/2005 Kosmatka
6,971,960 B2 12/2005 Dewanjee et al.
6,986,715 B2 1/2006 Mahaffey
7,029,403 B2 4/2006 Rice et al.
7,086,963 B1 8/2006 Onuki et al.
7,101,290 B2 9/2006 Tucker, Sr.
7,108,612 B2 9/2006 Nakahara et al.
7,121,958 B2 10/2006 Cheng et al.
7,140,974 B2 11/2006 Chao et al.
7,160,204 B2 1/2007 Huang
7,182,698 B2 2/2007 Tseng
7,214,143 B2 5/2007 Deshmukh
7,214,144 B2 5/2007 Tseng
7,267,620 B2 9/2007 Chao et al.
7,281,991 B2 10/2007 Gilbert et al.
7,281,994 B2 10/2007 De Shiell et al.
7,331,877 B2 2/2008 Yamaguchi et al.
7,357,731 B2 4/2008 Johnson
7,384,348 B2 6/2008 Lin
7,399,238 B2 7/2008 Hocknell et al.
7,410,428 B1 8/2008 Dawson
7,591,736 B2 9/2009 Ban
7,601,078 B2 10/2009 Mergy et al.
7,628,712 B2 12/2009 Chao et al.
7,775,903 B2 8/2010 Kawaguchi
7,811,179 B2 10/2010 Roach et al.
7,850,545 B2 12/2010 Wada et al.
7,867,612 B2 1/2011 Schwung et al.
7,874,938 B2 1/2011 Chao
7,927,229 B2 4/2011 Jertson et al.
7,985,146 B2 7/2011 Lin et al.
8,152,652 B2 4/2012 Curtis et al.
8,221,261 B2 7/2012 Curtis et al.
8,247,062 B2 8/2012 Morrison et al.
8,293,356 B2 10/2012 Merrill et al.
8,303,432 B2 11/2012 Curtis et al.
8,376,873 B2 2/2013 Golden et al.
8,376,879 B2 2/2013 Wada et al.
8,409,032 B2 4/2013 Myrhum et al.
8,430,986 B1 4/2013 Galloway
8,444,504 B2 5/2013 Chao et al.
8,496,542 B2 7/2013 Curtis et al.
8,517,859 B2 8/2013 Golden et al.
8,758,161 B2 6/2014 Golden et al.
8,864,602 B2 10/2014 Curtis
8,876,629 B2 11/2014 Deshmukh et al.
9,033,818 B2 5/2015 Myrhum
9,033,822 B1 5/2015 DeMille
9,192,826 B2 11/2015 Golden et al.
9,199,137 B2 12/2015 Deshmukh
9,370,698 B2 6/2016 Deshmukh
9,717,960 B2 8/2017 Deshmukh

(56) References Cited

U.S. PATENT DOCUMENTS

| | | | | |
|---|---|---|---|---|
| 10,143,898 | B2 | 12/2018 | Cornelius | |
| 10,357,901 | B2 | 7/2019 | Deshmukh | |
| 10,940,617 | B2 | 3/2021 | Deshmukh | |
| 11,186,016 | B2 | 11/2021 | Martens | |
| 11,318,643 | B2 | 5/2022 | Deshmukh | |
| 11,511,464 | B2 * | 11/2022 | Martens | B29C 43/3642 |
| 2001/0051549 | A1 | 12/2001 | Inoue et al. | |
| 2002/0019265 | A1 | 2/2002 | Allen | |
| 2002/0113338 | A1 | 8/2002 | Murphy | |
| 2002/0157720 | A1 | 10/2002 | Quigley | |
| 2002/0165040 | A1 | 11/2002 | Kosmatka et al. | |
| 2002/0187852 | A1 | 12/2002 | Kosmatka et al. | |
| 2002/0190439 | A1 * | 12/2002 | Nelson | B29C 33/52 264/317 |
| 2003/0183328 | A1 | 10/2003 | Lee | |
| 2004/0266550 | A1 | 12/2004 | Gilbert et al. | |
| 2005/0003903 | A1 | 1/2005 | Galloway | |
| 2005/0020378 | A1 | 1/2005 | Krumme | |
| 2005/0043117 | A1 | 2/2005 | Gilbert | |
| 2005/0064956 | A1 | 3/2005 | Lee | |
| 2005/0124437 | A1 | 6/2005 | Imamoto | |
| 2005/0209024 | A1 | 9/2005 | Oyama | |
| 2005/0215351 | A1 * | 9/2005 | Hasegawa | A63B 53/0466 473/345 |
| 2005/0215352 | A1 | 9/2005 | Oyama | |
| 2005/0233127 | A1 * | 10/2005 | Steffier | C04B 35/62868 428/292.1 |
| 2005/0239576 | A1 | 10/2005 | Stites | |
| 2006/0046868 | A1 * | 3/2006 | Murphy | A63B 53/0466 473/332 |
| 2006/0052185 | A1 | 3/2006 | Kawaguchi | |
| 2006/0220279 | A1 | 10/2006 | Reyes | |
| 2006/0229141 | A1 | 10/2006 | Galloway | |
| 2007/0060414 | A1 | 3/2007 | Breier | |
| 2007/0099722 | A1 | 5/2007 | Stevens | |
| 2007/0293349 | A1 * | 12/2007 | Chao | A63B 53/0466 473/342 |
| 2008/0004131 | A1 | 1/2008 | Lin et al. | |
| 2008/0051219 | A1 | 2/2008 | Erickson | |
| 2008/0076595 | A1 | 3/2008 | Lai et al. | |
| 2008/0149267 | A1 | 6/2008 | Chao | |
| 2008/0268980 | A1 | 10/2008 | Breier | |
| 2008/0289747 | A1 | 11/2008 | Modin | |
| 2008/0293511 | A1 | 11/2008 | Gilbert et al. | |
| 2008/0300068 | A1 | 12/2008 | Chao | |
| 2009/0163293 | A1 | 6/2009 | Gibb | |
| 2010/0125000 | A1 | 5/2010 | Lee | |
| 2011/0065528 | A1 | 3/2011 | Dawson | |
| 2011/0256954 | A1 | 10/2011 | Soracco | |
| 2012/0135822 | A1 | 5/2012 | Deshmukh et al. | |
| 2012/0289363 | A1 | 11/2012 | Myrhum et al. | |
| 2013/0252757 | A1 | 9/2013 | Deshmukh et al. | |
| 2014/0038749 | A1 | 2/2014 | Beach | |
| 2015/0045146 | A1 | 2/2015 | Deshmukh et al. | |

OTHER PUBLICATIONS

Machine Translation of JPH05-7261.

* cited by examiner

GOLF CLUB HEAD HAVING MULTI-MATERIAL FACE AND METHOD OF MANUFACTURE

RELATED APPLICATIONS

This application is a Continuation of U.S. patent application Ser. No. 17/186,791, filed on Feb. 26, 2021, currently pending, which is a Continuation of U.S. patent application Ser. No. 17/098,227, filed on Nov. 13, 2020, now U.S. Pat. No. 11,186,016, which is a Continuation-In-Part (CIP) of U.S. patent application Ser. No. 16/453,095, filed on Jun. 26, 2019, now U.S. Pat. No. 10,940,617, which is a Continuation (CON) of U.S. patent application Ser. No. 14/581,090, filed on Dec. 23, 2014, now U.S. Pat. No. 10,357,901, which is a Continuation-In-Part (CIP) of U.S. patent application Ser. No. 14/070,311, filed Nov. 1, 2013, now U.S. Pat. No. 9,192,826, which is a CIP of U.S. patent application Ser. No. 13/326,967, filed on Dec. 15, 2011, now U.S. Pat. No. 8,876,629, which is a continuation-in-part of U.S. patent application Ser. No. 12/832,461, filed on Jul. 8, 2010, now U.S. Pat. No. 8,221,261, the disclosures of which are all incorporated by reference in their entirety.

FIELD OF THE INVENTION

The present invention relates generally to a golf club head having a multi-material face. More specifically, the present invention relates to a golf club head with a striking face having a pocket at the frontal portion of the striking face. The pocket at the frontal portion of the striking face may be filled with a material having a different density than the material used to form the remainder of the striking face. The multi-material striking face in accordance with the present invention may utilize a lighter second material having a second density to fill in the pocket created by the striking face, while the remainder of the striking face utilizes a heavier first material that has a first density. The golf club head created by this multi-material striking face may have a Characteristic Time (CT) slope of greater than about 5 and less than about 50 measured in accordance with the United States Golf Association's (USGA's) Characteristic Time (CT) test.

BACKGROUND OF THE INVENTION

In order to improve the performance of a golf club, golf club designers have constantly struggled with finding different ways to hit a golf ball longer and straighter. Designing a golf club that hits a golf ball longer may generally require an improvement in the ability of the golf club head to effectively transfer the energy generated by the golfer onto a golf ball via the golf club. Hitting a golf ball straighter, on the other hand, will generally require an improvement in the ability of the golf club to keep the golf ball on a relatively straight path even if the golf ball is struck off-center; as a golf ball that is struck at the center of the golf club head will generally maintain a relatively straight flight path.

Effectively transferring the energy generated by the golfer onto a golf ball in order to hit a golf ball further may be largely related to the Coefficient of Restitution (COR) between the golf club and the golf ball. The COR between a golf club and a golf ball may generally relate to a fractional value representing the ratio of velocities of the objects before and after they impact each other. U.S. Pat. No. 7,281,994 to De Shiell et al. provides one good example that explains this COR concept by discussing how a golf club head utilizing a thinner striking face may deflect more when impacting a golf ball to result in a higher COR; which results in greater travel distance.

Being able to hit a golf ball relatively straight even when the club strikes a golf ball at a location that is offset from the center of the striking face may generally involve the ability of the golf club to resist rotational twisting; a phenomenon that occurs naturally during off-center hits. U.S. Pat. No. 5,058,895 to Igarashi goes into more detail on this concept by discussing the advantages of creating a golf club with a higher Moment of Inertia (MOI), which is a way to quantify the ability of a golf club to resist rotational twisting when it strikes a golf ball at a location that is offset from the geometric center of the golf club head. More specifically, U.S. Pat. No. 5,058,895 to Igarashi utilizes weights at the rear toe, rear center, and real heel portion of the golf club head as one of the ways to increase the MOI of the golf club head, which in turn allows the golf club to hit a golf ball straighter. It should be noted that although the additional weights around the rear perimeter of the golf club head may increase the MOI of the golf club, these weights can not be added freely without concern for the overall weight of the golf club head. Because it may be undesirable to add to the overall weight of the golf club head, adding weight to the rear portion of the golf club head will generally require that same amount of weight to be eliminated from other areas of the golf club head.

Based on the two above examples, it can be seen that removing weight from the striking face of the golf club head not only allows the golf club head to have a thinner face with a higher COR, the weight removed can be placed at a more optimal location to increase the MOI of the golf club head. One of the earlier attempts to remove unnecessary weight from the striking face of a golf club can be seen in U.S. Pat. No. 5,163,682 to Schmidt et al. wherein the striking face of a golf club head has a variable thickness by making the part of the striking face that is not subjected to the direct impact thinner.

U.S. Pat. No. 5,425,538 to Vincent et al. shows an alternative way to remove unnecessary weight from the striking face of a golf club by utilizing a fiber-based composite material. Because fiber-based composite materials may generally have a density that is less than the density of traditional metals such as steel or titanium, the simple substitute of this fiber-based composite material alone will generate a significant amount of discretionary weight that can be used to improve the MOI of a golf club. Fiber-based composite materials, because of their relatively lightweight characteristics, tend to be desirable removing weight from various portions of the golf club head. However, because the durability of such a lightweight fiber-based composite material can be inferior compared to a metallic type material, completely replacing the striking face of a golf club with the lightweight fiber-based composite material could sacrifice the durability of the golf club head.

U.S. Pat. No. 7,628,712 to Chao et al. discloses one way to improve the durability of striking face made out of a fiber-based composite material by using a metallic cap to encompass the fiber-based composite material used to construct the striking plate of the golf club head. The metallic cap aids in resisting wear of the striking face that results from repeated impacts with a golf ball, while the rim around the side edges of the metallic ring further protects the composite from peeling and delaminating. The utilization of a metallic cap, although helps improve the durability of the striking face of the golf club head, may not be a viable solution, as severe impact could dislodge the fiber-based composite from the cap.

In addition to the durability concerns of the fiber resin matrix itself, utilizing composite materials to form the striking face of a golf club offers additional challenges. More specifically, one of the major design hurdles arises when a designer attempts to bond a fiber-based composite material to a metallic material, especially at a location that is subjected to high stress levels normally generated when a golf club hits a golf ball. Finally, the usage of composite type materials to form the striking face portion of the golf club head may also be undesirable because it alters the sound and feel of a golf club away from what a golfer are accustomed to, deterring a golfer from such a product.

Ultimately, despite all of the attempt to improve the performance of a golf club head by experimenting with alternative face materials, the prior art lacks a way to create a striking face that saves weight, improves COR, and is sufficiently durable without sacrificing the sound and feel of the golf club head. Hence, as it can be seen from above, there is a need in the field for a golf club head having a fiber based composite striking face that can save weight, improve the COR of the golf club head, and can endure the high stress levels created by the impact with a golf ball, all without sacrificing the sound and feel of the golf club head.

BRIEF SUMMARY OF THE INVENTION

One aspect of the present invention is a golf club head comprising a striking face and a body portion. The striking face is located near a forward portion of the golf club head while the body portion is connected to an aft portion of the striking face. The striking face further comprising a perimeter portion made out of a first material having a first density around a border of the striking face and a central portion near a center of the striking face surrounded by the perimeter portion; wherein the central portion defines a pocket in the center of the striking face. The body portion further comprises a crown, a sole, and a skirt. The pocket formed at the central portion of the striking face is filled with a face insert that is made out of a second material having a second density; wherein the second density is less than the first density. Finally, the striking face disclosed above has a characteristic time slope of greater than about 5 and less than about 50.

In another aspect of the present invention, a golf club head is provided comprising a body made out of a first material having a first density having a front portion defining a pocket therein, and a face insert made out of a second material having a second density disposed within said pocket; wherein the second density is less than the first density. The striking face has a characteristic time slope of greater than about 5 and less than about 50, and the golf club head has a first peak frequency to volume ratio of greater than about 7.0 hertz, the first peak frequency to volume ratio is defined as a first peak frequency of a signal power diagram of the sound of the golf club head as it impacts a golf ball divided by a volume of the golf club head.

In a further aspect of the present invention, a golf club head is provided comprising a striking face made out of a first material having a first density located near a forward portion of the golf club head, said striking face defining a pocket at a center of the striking face, and a face insert made out of a second material having a second density positioned within the pocket; wherein the second density is less than the first density. The striking face disclosed here also comprises an undercut around a perimeter of the pocket.

In a further aspect of the present invention the central portion of the striking face further defines a pocket having a dovetail shaped undercut, and the pocket is filled with a face insert having a dovetail shaped protrusion around its perimeter, the dovetail shaped protrusion is adapted to engage the dovetail shaped undercut.

These and other features, aspects and advantages of the present invention will become better understood with reference to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

The following detailed description describes the best currently contemplated modes of carrying out the invention. The description is not to be taken in a limiting sense, but is made merely for the purpose of illustrating the general principles of the invention, since the scope of the invention is best defined by the appended claims.

Various inventive features are described below and each can be used independently of one another or in combination with other features. However, any single inventive feature may not address any or all of the problems discussed above or may only address one of the problems discussed above. Further, one or more of the problems discussed above may not be fully addressed by any of the features described below.

Figure 1:
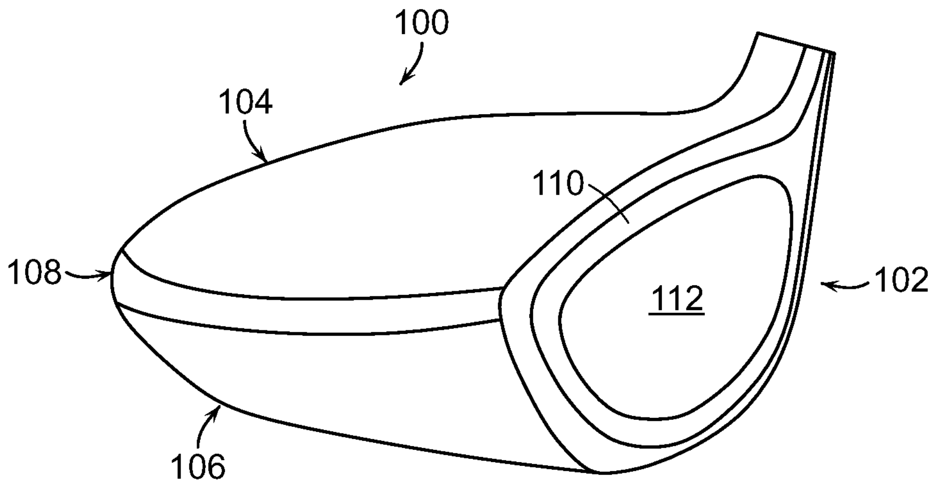
FIG. 1 shows a perspective view of a golf club head in accordance with an exemplary embodiment of the present invention.

FIG. 1 of the accompanying drawings shows a perspective view of a golf club head 100 in accordance with an exemplary embodiment of the present invention. More specifically, FIG. 1 shows a golf club head 100 with a striking face 102 located at a forward portion of the golf club head 100 with a body portion connected to an aft portion of the striking face 102. The aft body portion of the golf club head 100, in this current exemplary embodiment, may generally be comprised of a crown 104, a sole 106, and a skirt 108. The striking face 102 described in this current exemplary embodiment of the present invention may generally have a perimeter portion 110 around the external border of the striking face 102 and a central portion 112 at the central region of the striking face 102. This distinction between the perimeter portion 110 and the central portion 112 of the striking face 102 is important in this current exemplary embodiment of the present invention because a different material could be used to construct the central portion 112 of the striking face 102 than what is used to for the remainder of the golf club head 100, including the perimeter portion 110. Despite the above, perimeter portion 110 could also be constructed out of a different material than the remainder of the golf club head 100 as well as the striking face 102 to further improve the performance of the golf club head 100 without departing from the scope and content of the present invention.

In one exemplary embodiment of the present invention the perimeter portion 110 of the striking face 102 may generally be constructed out of a first material that may generally be metallic with a relatively high first density; for example, titanium or steel. These materials, although typically strong enough to withstand the impact forces between a golf club head 100 and a golf ball, tend to be on the heavy side. More specifically, steel, being the heavier of the two materials mentioned above, may generally have a density of between about 5.0 g/cm$^3$ and 8.00 g/cm$^3$. Titanium, on the other hand, may generally be less dense than steel, with a density of about 4.00 g/cm$^3$ to about 5.00 g/cm$^3$.

With discretionary weight within a golf club at such a premium, any amount of weight that can be saved from any portion of the golf club head 100 can be helpful in improving the Center of Gravity (CG) location and the Moment Of Inertia (MOI) of the golf club head 100. Hence, in an attempt to save weight from the striking face 102 of the golf club head 100, the current exemplary embodiment of the present invention shown in FIG. 1 may utilize a second material with a relatively low second density to construct the central portion 112 of the striking face 102. More specifically, the central portion 112 of the striking face 102 may be constructed using an aluminum material with a density of about 2.7 g/cm$^3$, a magnesium material with a density of about 1.738 g/cm$^3$, a composite type material with a density of about 1.70 g/cm$^3$, or any other material having a lower density than the density of the first material all without departing from the present invention. Due to the lighter second density of the second material used to construct the central portion 112, the total weight of the entire striking face 112 may be significantly less and in the range of about 15 to about 25 grams; especially when compared to a striking face 102 that is constructed completely out of a denser material such as titanium. This weight savings may generally be calculated based on a striking face 112 that is about 60 mm to 80 mm wide, about 25 mm to 50 mm high, and about 2.0 mm to 3.5 mm thick. It is worth noting that utilizing a second material with a lower second density to construct the central portion 112 of the striking face 102 may come with certain design challenges, as materials having a lower density may not be sufficiently strong enough to withstand the impact forces between a golf club head 100 and a golf ball.

Figure 2:
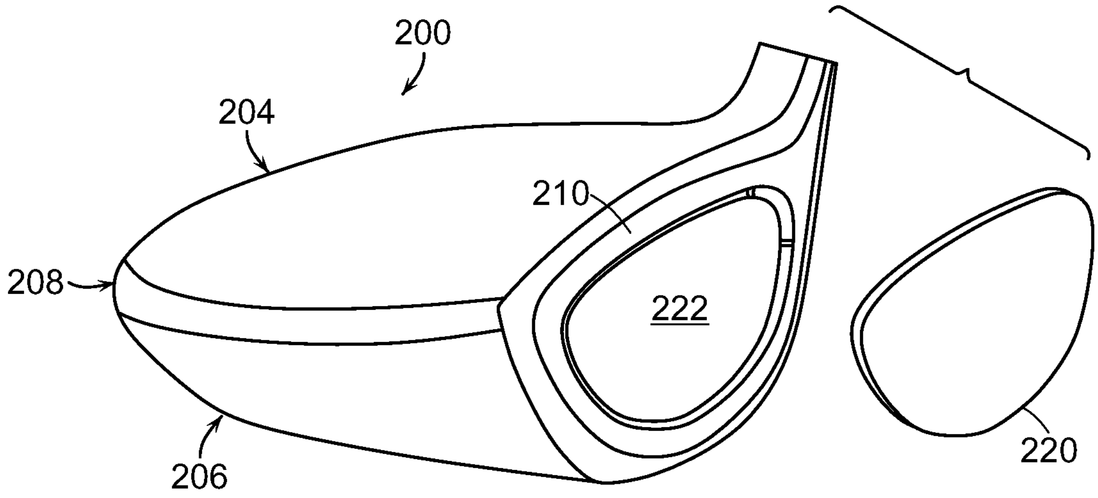
FIG. 2 shows an exploded perspective view of a golf club head with the face insert detached from its pocket within the golf club head in accordance with an exemplary embodiment of the present invention.

The current invention, in order to address the durability issue above, may utilize a dual layered central portion 112 comprised out of two different materials that could offer up a combination of both the lightweight benefits of the second material in conjunction with the strength and durability benefits of the first material. FIG. 2 of the accompanying drawings showing an exploded perspective view of a golf club head 200 gives a better illustration of the dual layered central portion 212 in accordance with an exemplary embodiment of the present invention. More specifically, the exploded view of golf club head 200 allows the face insert 220 and the pocket 222 to be shown. Because the pocket 222 shown in the current exemplary embodiment of the present invention is not designed to completely penetrate the entire thickness of the central portion of the striking face 210, it leaves a layer of metallic first material to serve as a backing to the lightweight second material used for the face insert 220. The face insert 220, as discussed above being made out of a lightweight second material, may generally be constructed independently from the remainder of the golf club head 200, and inserted into its resting place within the pocket 222 after the golf club head is completed. Finally, it is worth noting that the geometry of the face insert 220 may generally mimic the geometry of the pocket 222, allowing the two components to be seamlessly assembled with one another Face insert 220, although discussed above as being capable of being comprised out of numerous types of light density materials, may generally be comprised out of composite type material in one exemplary embodiment of the present invention. Composite type materials, as referred to in this current invention, may generally apply to engineered materials made from two or more constituent materials with significantly different physical or chemical properties which remain separate and distinct on a macroscopic level. More specifically, composite type material may refer to woven webs of carbon fiber that is impregnated with a thermoplastic or thermohardenable resin material; more commonly known as resin impregnated carbon fiber.

Figure 3:
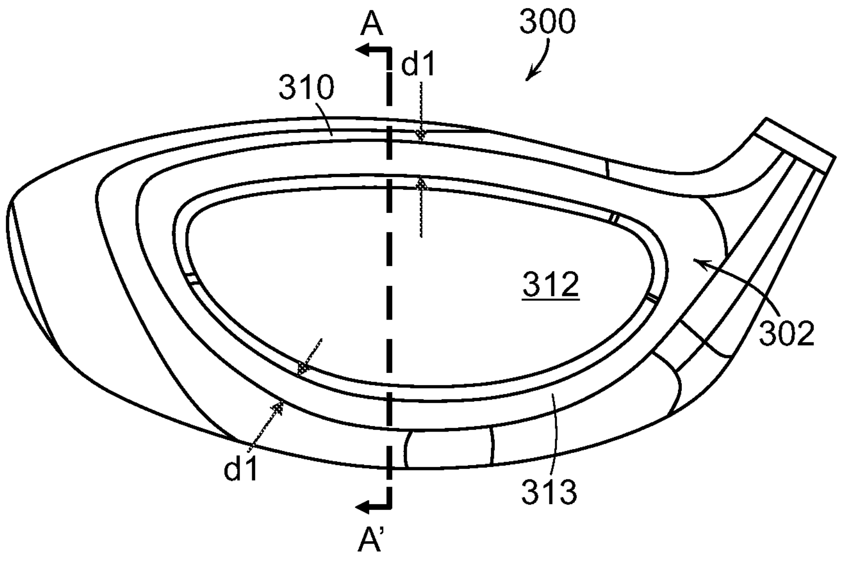
FIG. 3 shows a frontal view of the golf club head in accordance with an exemplary embodiment of the present invention.

FIG. 3 of the accompanying drawings shows a frontal view of a golf club head 300 in accordance with an exemplary embodiment of the present invention. The frontal view of the golf club head 300 shows the relative size, distance, and percentage of the central portion 312 compared to the perimeter portion 310 as well as the striking face 302. More specifically, in this exemplary embodiment of the present invention, the striking face 302 may generally have a frontal surface area of greater than about 3600 mm$^2$ and less than about 4000 mm$^2$, more preferably greater than about 3300 mm$^2$ and less than about 3900 mm$^2$, and most preferably about 3800 mm$^2$. The central portion 312, on the other hand, may generally have a frontal surface area of greater than about 2500 mm$^2$ and less than about 2900 mm$^2$, more preferably greater than about 2600 mm$^2$ and less than about 2800 mm$^2$, and most preferably about 2700 mm$^2$. Finally, the frontal surface area of the perimeter portion 310 may generally be able derived by subtracting the area of the central portion 312 from the striking face 302, yielding a range of greater than about 900 $mm^2$ and less than about 1300 $mm^2$, more preferably greater than about 1000 $mm^2$ and less than about 1200 $mm^2$, and most preferably about 1100 $mm^2$. It should be noted that the central portion 312 shown in the current exemplary embodiment may mimic the external geometry of the striking face 302 in order to improve the coverage of the central region without departing from the scope and content of the present invention.

In order to have a sufficiently large pocket at the central portion 312 that is comprised out of a lightweight second material, the central portion 312 must make up a significant portion of the striking face 302. Alternatively speaking, the central portion to striking face ratio needs to be greater than about 0.65, more preferably greater than about 0.70, and most preferably greater than about 0.75. The central portion to striking face ratio is defined as the frontal surface area of the central portion 312 divided by the frontal surface area of the striking face 302 as shown below in Equation (1):

$$\text{Central Portion to Striking Face Ratio} = \frac{\text{Frontal Surface Area of Central Portion}}{\text{Frontal Surface Area of Striking Face}} \quad \text{Eq. (1)}$$

Ultimately, the striking face 302 could be divided into a central portion 312 and a perimeter portion 313, wherein the central portion 312 defines a pocket that can be filled with the secondary material mentioned above.

The frontal view of the golf club head 300 shown in FIG. 3 also shows the offset of the central portion 312 away from the perimeter of the striking face 302 being at an offset distance d1, defined as the distance between the perimeter of the striking face 302 and the perimeter of the central portion 312. Offset distance d1, as shown in this current exemplary embodiment, may generally help define the size of the pocket within the central portion 312, which determines the amount of second material that can be used to fill in the pocket to alter the performance of the golf club head 300. In one exemplary embodiment of the present invention, offset distance d1 may generally be less than about 0.5 inches, more preferably less than about 0.33 inches, and most preferably greater than about 0.25 inches all without departing from the scope and content of the present invention. Although the golf club head 300 shown in FIG. 3 shows a constant offset distance d1 across the entire perimeter of the striking face 302, the offset distance d1 may vary to find the correct balance between weight removal and durability without departing from the scope and content of the present invention.

Figure 4:
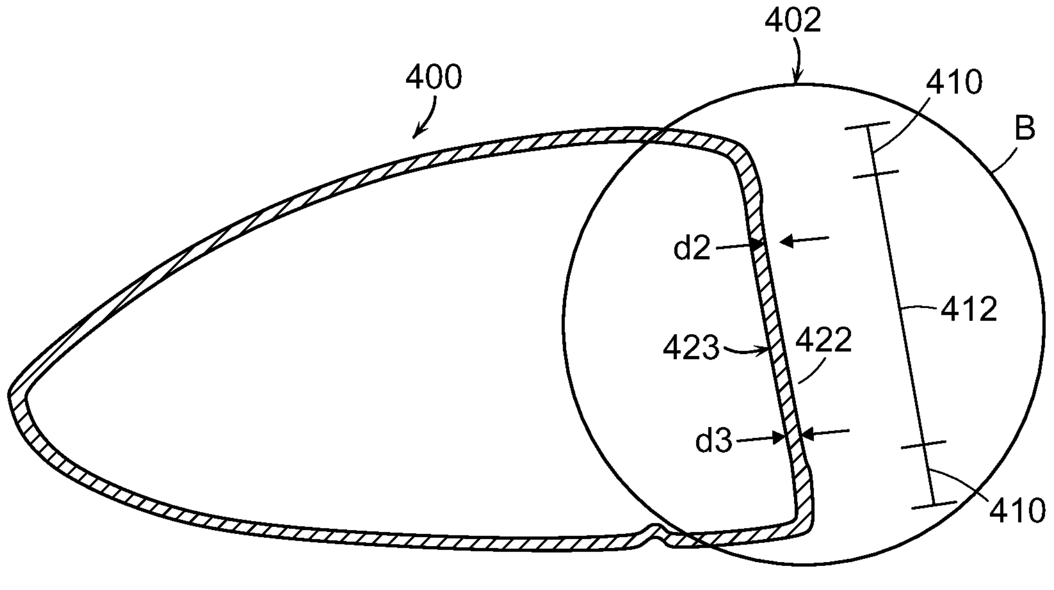
FIG. 4 shows a cross-sectional view of the golf club head taken along cross-sectional line A-A' shown in FIG. 3 in accordance with an exemplary embodiment of the present invention.

FIG. 4 of the accompanying drawings shows a cross-sectional view of a golf club head 400 in accordance with an exemplary embodiment of the present invention taken along cross-sectional line A-A' shown in FIG. 3. The cross-sectional view of the golf club head 400 allows a clearer view of the pocket 422 as well as the backing portion 423 of the central portion 412 of the golf club head 400. Because the weight savings achievable by the lightweight second material within the pocket 422 needs to be balanced out with the strength and durability of the metallic material within the backing portion 423, the relative thicknesses of the pocket 422 and the backing portion 423 are important to the current invention. In one exemplary embodiment of the present invention, the depth d2 of the pocket may be kept constant at greater than about 0.2 mm and less than about 2.0 mm, more preferably at greater than about 0.5 mm and less than about 1.5 mm, and most preferably at about 1.0 mm. In order to balance out the durability sacrificed by the utilization of a lighter second material within the pocket 422, the backing portion 423 may generally need to maintain a thickness d3 that allows the golf club head 400 to endure the impact forces with a golf ball. Hence, the thickness d3 of the backing portion 423 may generally have a constant thickness that is greater than about 1.5 mm and less than about 3.0 mm, more preferably greater than about 1.75 mm and less than about 2.75 mm, most preferably about 2.25 mm.

Despite the thicknesses articulated above, it should be noted that the more important number here is the ratio of the relative thickness between the d2 and d3; which quantifies the relative thicknesses of depth d2 of the pocket 422 as well as the thickness d3 of the backing portion 423. This ratio, referred to as a "striking thickness ratio" within the context of this application, indirectly quantifies the ability of the golf club head 400 to reduce unnecessary weight from the striking face 402 while maintaining the durability of the striking face 402. Striking thickness ratio, as referred to in this current application, may more specifically be defined as the depth d2 of the pocket 422 divided by the thicknesses d3 of the backing portion 423 shown below in Equation (2):

$$\text{Striking Thickness Ratio} = \frac{\text{depth } (d2) \text{ of pocket}}{\text{thickness } (d3) \text{ of backing portion}} \quad \text{Eq. (2)}$$

The striking thickness ratio, as described above in this exemplary embodiment, may generally be less than about 1.0, more preferably less than about 0.8, and most preferably less than about 0.7.

Figure 5:
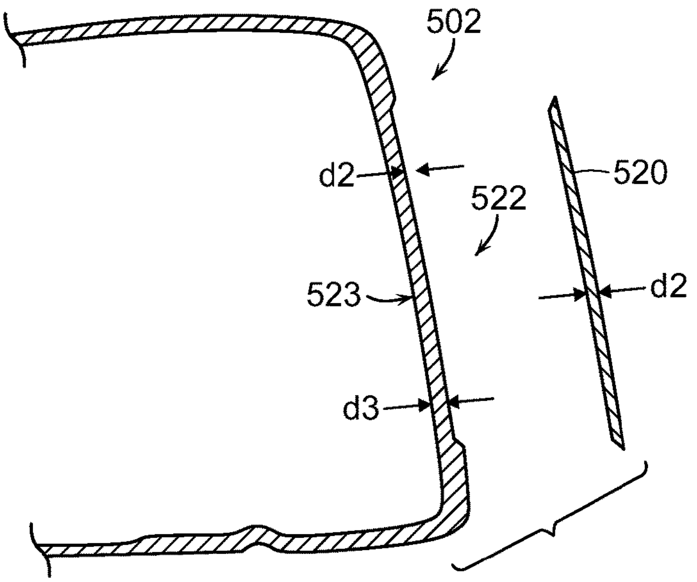
FIG. 5 shows an enlarged cross-sectional view of the golf club head focusing on the striking face portion of the golf club head in accordance with one exemplary embodiment of the present invention.

FIG. 5 of the accompanying drawings shows an enlarged cross-sectional view of the circular region B shown in FIG. 4. More specifically, the enlarged view of the striking face 402 of the golf club head 400 shown in FIG. 5 allows a clearer view of relative thicknesses d3 and depth d2 of the backing portion 423 and the pocket 422 respectively. In addition to the above, FIG. 5 also shows the face insert 520 being constructed out of a second material having a second density being removed from it's resting place within the pocket 522. One of the first things to recognize about FIG. 5 is the relative size and shape of the face insert 520 being reasonably similar to the size and shape of the pocket 522. Put it in another way, the face insert 520 may generally be designed with a size and shape that allows it to fit within the pocket 522 without departing from the scope and content of the present invention. More specifically, as it can be seen from FIG. 5, the thickness d2 of the face insert may generally be substantially similar to the depth d2 of the pocket 522, illustrating the similarities.

Although minimally visible from FIG. 5, it is commonly known that the striking face 502 portion of a modern day golf club head may generally have a slight curvature to help correct the adverse effects resulting from off center hits. This slight curvature of the striking face 502 portion of the modern day golf club head may be more commonly known as the bulge and roll of the golf club head, depending on whether the point of reference is taken from the horizontal orientation or a vertical orientation. It is worth noting here that the thicknesses d2 of the striking face 502 and/or the pocket 522 may generally be determined from the frontal surface of the striking face 502, meaning the pocket 522 will have the same bulge and roll curvature as the front of the striking face 520. Maintaining the bulge and roll curvature radius within the pocket 522 is advantageous to the durability of the striking face 502 of the golf club head, as a convex shaped surface will be able to absorb impact forces better than a flat or even concave shaped pocket 522. It should be noted, however, the pocket 522 need not have a convex surface in all embodiments to be within the scope and content of the present invention, the internal surface of the pocket 522 may be flat or even have a concaved shape, especially in situations where the striking face 502 is already durable enough to absorb the impact forces.

The relative similar size and shape of the face insert 520 and the pocket 522 will generally help enhance the bonding of the face insert 520 within the pocket 522. However, in addition to this pre-existing mechanical bond utilizing the geometry of the components, the bond between the face insert 520 and the pocket 522 could generally be enhanced with the usage of an adhesive type substance. Adhesive type substance, as discussed in this current application, may generally be a synthetic type adhesive; however, adhesive type substance may also be a natural adhesive, a contact adhesive, a trying adhesive, a hot melt adhesive, UV light curing adhesive, pressure sensitive adhesive, or any type of adhesive capable of creating a chemical bond that holds the face insert 520 within the pocket 522 all without departing from the scope and content of the present invention.

FIGS. 6, 6A, 6B, 6C, and 6D of the accompanying drawings shows further alternative embodiments of the present invention wherein the pocket 622 may contain an undercut 628 around the perimeter engagement portion C between the face insert 620 within the pocket 622 that further enhances the bond between the two above mentioned components. More specifically, FIGS. 6A, 6B, 6C, and 6D show enlarged views of various different types of undercut 628 that could be used to enhance the attachment of the face insert 620 within the pocket 622 all without departing from the scope and content of the present invention. Before going into more detail about the various pockets 622 geometries, a brief discussion regarding the method of inserting the face insert 620 into the pocket 622 having such an undercut 628 will help explain the ingenuity of the current invention. Looking at FIGS. 6, 6A, 6B, 6C, and 6D, it can be seen that it could be physically difficult to place the face insert 620 having a larger diameter past the undercut 628 into the pocket 622. Hence, in order to place the face insert 620 into a pocket 622 that has an undercut 628, the composite material used to form the face insert 620 may need to be placed in the pocket 622 before curing. Resin impregnated materials, unlike metallic materials that have a rigid body, may generally have a pliable structure until the resin is cured. Hence, it can be seen from above, if a composite type material is used to construct the face insert 620, the pliable nature of the composite material before curing allows the face insert to fit into the pocket 622.

In addition to the pliable nature of the resin impregnated composite type material used to construct the face insert 620, the multiple layers of fibrous material used to form the resin impregnated composite will also allow the pocket 622 to be filled with the resin impregnated composite around the undercut 628. More specifically, because resin impregnated composite material is built by layering thin layers of resin fibers on top of one another, the various fibers layers can be filled into the pocket 622 to get around the undercut 628 without departing from the scope and content of the present invention.

Figure 6:
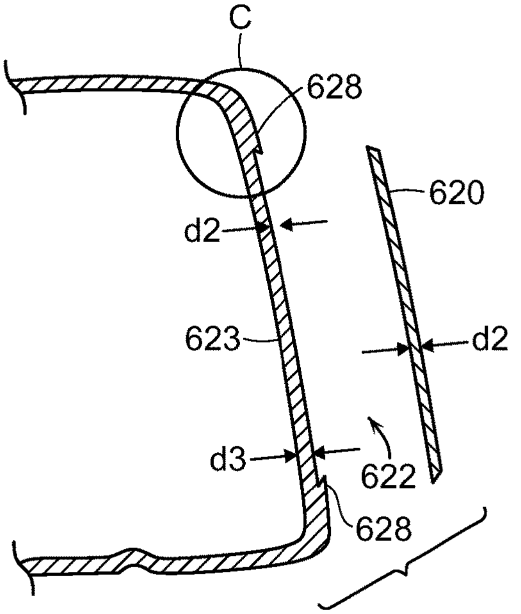
FIG. 6 shows an enlarged cross-sectional view of the golf club head focusing on the striking face portion of the golf club head in accordance with a further exemplary embodiment of the present invention.
Figure 6A:
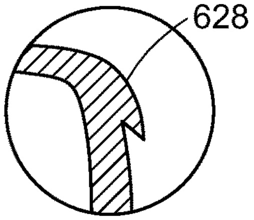
FIG. 6A shows a further enlarged cross-sectional view of the golf club head focusing on the perimeter of the pocket in accordance with a further exemplary embodiment of the present invention.
Figure 6B:
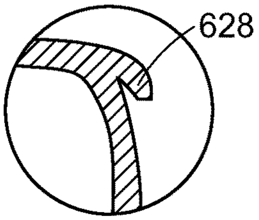
FIG. 6B shows a further enlarged cross-sectional view of the golf club head focusing on the perimeter of the pocket in accordance with a further exemplary embodiment of the present invention.
Figure 6C:
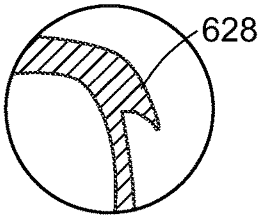
FIG. 6C shows a further enlarged cross-sectional view of the golf club head focusing on the perimeter of the pocket in accordance with a further exemplary embodiment of the present invention.
Figure 6D:
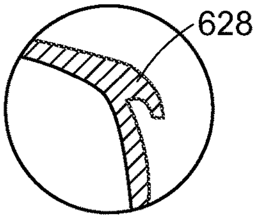
FIG. 6D shows a further enlarged cross-sectional view of the golf club head focusing on the perimeter of the pocket in accordance with a further exemplary embodiment of the present invention.

FIGS. 6A, 6B, 6C, and 6D all show different enlarged views of the perimeter engagement portion C allowing a clearer view of the various undercut 628 geometries in accordance with various embodiments of the present invention. More specifically, FIG. 6A shows a V shaped undercut 628 that helps secure the face insert 620 in the pocket 622. FIG. 6B shows a V shaped undercut 628 with a flat portion near the external tip of the undercut 628 to eliminate sharp corners that could result in impact high stress. FIG. 6C shows a further alternative embodiment of the present invention wherein a U shaped undercut 628 may be used to help secure the face insert 620 in the pocket 622. Finally, FIG. 6D shows a further alternative embodiment of the present invention wherein a U shaped undercut 628 has a flat tip to completely eliminate sharp corners that could crack or break during impact.

At this point, it is worthwhile to recognize that having a pocket 622 at the striking face 602 portion of the golf club head may offer additional performance benefits than what's immediately recognizable. More specifically, in addition to the obvious performance benefits that can be achieved by creating more discretionary weight from this type of geometry shown above, utilizing this type of a pocket 622 will allow the golf club head to maintain the a desirable acoustic sound. Acoustic sound of a golf club head, although difficult to quantify, is something that greatly influences the perceived performance of a golf club head. Because composite type materials may generally offer a very different acoustic sound than a metallic type material, it may be important to the current invention to adjust the acoustic sound of the golf club head to be relatively similar to a golf club head having a completely metallic striking face.

Figure 7:
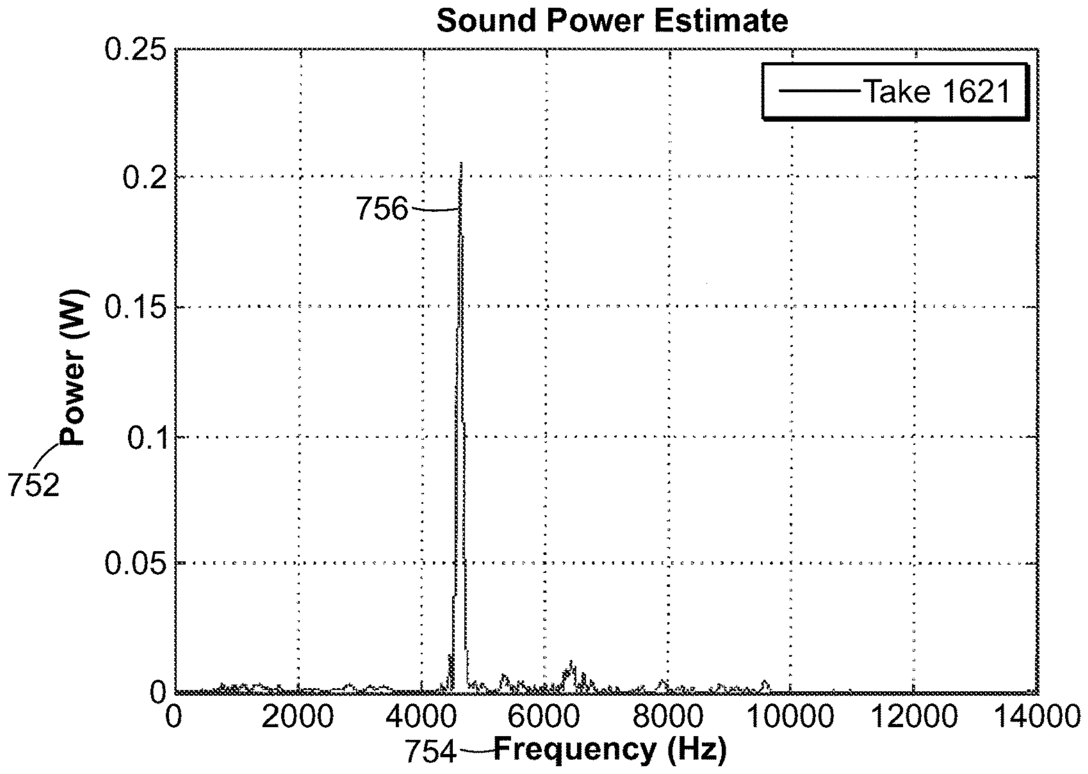
FIG. 7 (Prior Art)
FIG. 7 shows a signal power diagram of a prior art golf club head quantifying the sound of the prior art golf club head.

FIG. 7 of the accompanying drawings shows a signal power diagram of a prior art golf club head having a completely metallic striking face, illustrating the acoustic characteristics of a golf club head that produces a desirable sound. More specifically, FIG. 7 captures the power 752 of the sound generated by the prior art golf club head as it impacts a golf ball as a function of the frequency 754. This power 752 and frequency 754 may quantify the vibration of the various components of the golf club head such as the crown, sole, face, or any other complement of a golf club head as it impacts a golf ball. As we can see from FIG. 7, this prior art golf club head having a completely metallic striking face may produce a first peak 756 in sound power 752 at about 4,000 hertz. The peak 756 sound power 752, as shown in this current prior art golf club head that has a completely metallic striking face, may generally have a total sound power output of about 0.2 watts. Hence, based on the above, it can be observed that a desirous sound of a golf club head with a completely metallic striking face may have a first peak of power at a frequency that is greater than about 3,500 hertz, more preferably greater than about 3,750 Hertz, and most preferably greater than about 4,000 Hertz.

Figure 8:
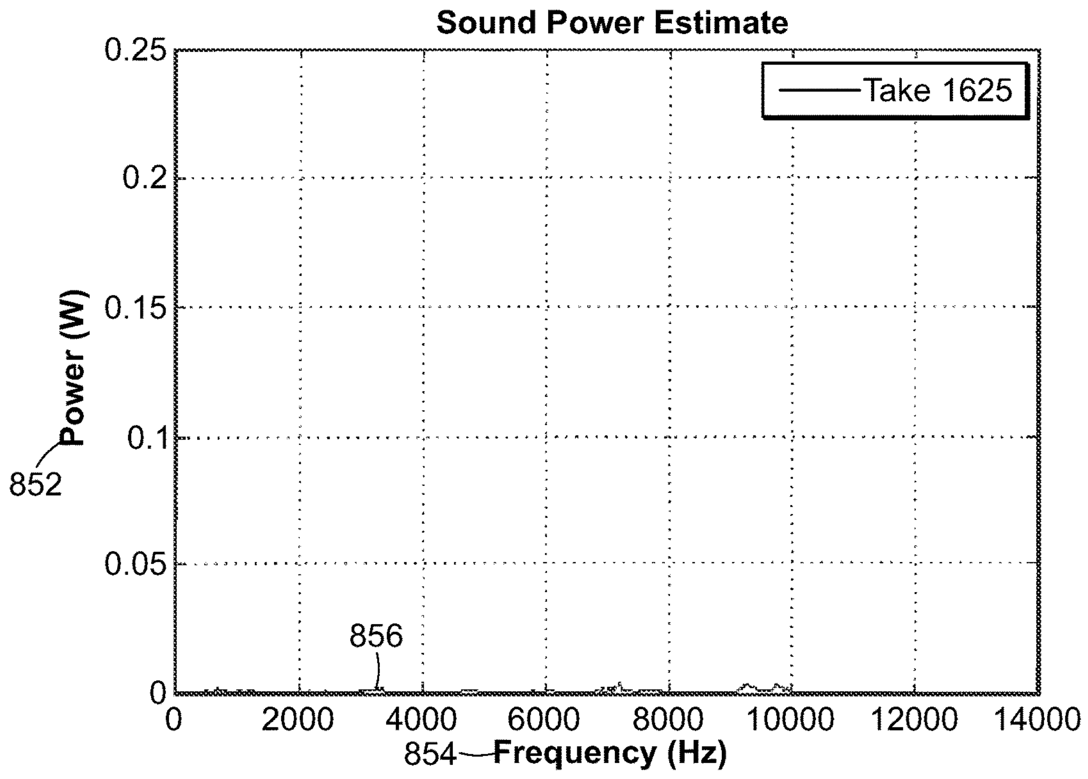
FIG. 8 (Prior Art)
FIG. 8 shows a signal power diagram of a different prior art golf club head quantifying the sound of the different prior art golf club head.

FIG. 8 of the accompanying drawings shows a signal power diagram of a prior art golf club head having a completely composite striking face, illustrating the dramatic change in the acoustic sound characteristic of such a type of golf club head. Right off the bat, one can see from FIG. 8 the power of the sound produced by a prior art golf club head having a completely composite striking face is significantly less than that of a traditional prior golf club head that has a metallic striking face. Although barely noticeable when plotted in the same scale as the diagram in FIG. 7, this completely composite prior art golf club head may generally have a first peak 856 in sound power 852 at about 3,000 hertz. The peak 856 sound power 852, as shown in this current prior art golf club head having a completely composite striking face, may generally have a total sound power 852 output of less than about 0.002 watts. Hence, when compared to the signal power diagram of a prior art golf club head having a completely metallic striking face shown in FIG. 7, one can see that completely replacing the striking face of a golf club head with composite material greatly sacrifices the desirable sound of a golf club head.

Figure 9:
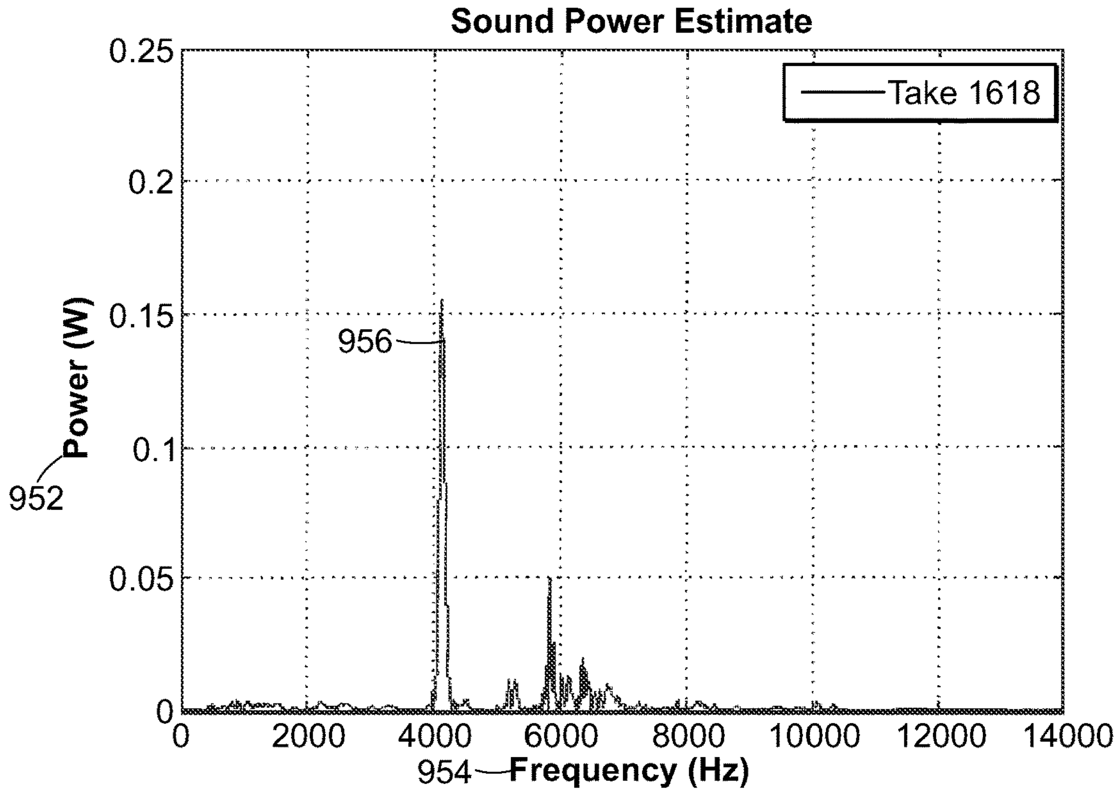
FIG. 9 shows a signal power diagram of an exemplary embodiment of the present invention that quantifies the sound of the current exemplary golf club head.

Turning now to FIG. 9 of the accompanying drawings we can see the signal power diagram of a golf club head in accordance with the current invention. Even at an initial glance, it is immediately noticeable that the signal power diagram of the current invention more resembles the signal power diagram of a prior art golf club head with a completely metallic striking face shown in FIG. 7. More specifically, the signal power diagram of the current inventive golf club head may have a first peak 956 in sound power 952 occurring at greater than about 3,500 hertz and less than about 4,500 hertz, more preferably greater than about 3,750 hertz and less than about 4,250 hertz, and most preferably about 4,000 hertz. The peak 956 sound power 952 of the current inventive golf club head having a pocket at the striking face may yield a total sound power 952 output of greater than about 0.1 watts, more preferably greater than about 0.125 watts, most preferably about 0.15 watts. Because the signal power diagram of the current inventive golf club head shows significant similarities to the signal power diagram of a prior art golf club head with a completely metallic face, the acoustic sound of the current inventive golf club head is desirable despite having a composite type face insert.

Because the desirability of the acoustic sound coming from the different golf club heads are dependent upon the above mentioned values within the signal power diagram, it may be easier to quantify these values as a relationship to one another for ease of comparison. Equation (3) below creates a peak power to frequency ratio that captures the desirable sound of a golf club head in a way that is easily quantifiable.

$$\text{Peak Power to Frequency Ratio} = \frac{\text{Peak Power}}{\text{Frequency where Peak Power Occurs}} \quad \text{Eq. (3)}$$

The peak power to frequency ratio of a golf club head in accordance with an exemplary embodiment of the present invention may generally be greater than about $2.5*10^{-5}$ watts/hertz and less than about $5*10^{-5}$ watts/hertz, more preferably greater than about $3.0*10^{-5}$ watts/hertz and less than about $4.5*10^{-5}$ watts/hertz, and most preferably about $4.0*10^{-5}$ watts/hertz.

Although the peak power to frequency ratio described above quantifies the acoustic sound of a golf club as it impacts a golf ball, it does not take in consideration of the size of the golf club head. Because the acoustic sound of a golf club head may generally be caused by the vibration of the golf club head as it impacts a golf ball, the size of the golf club head is an important factor in determining the amount of surface area that is available for such a vibration when the golf club head is used to impact a golf ball. Hence, another important ratio to recognize in quantifying the sound of a golf club head may be the first peak frequency to volume ratio of a golf club head. Similar to the discussion above describing what the desirable sound it, the golf club head in accordance with the current invention may generally have a first peak in frequency occurring within the range of greater than about 3,500 hertz and less than about 4,500 hertz, more preferably greater than about 3,750 hertz and less than about 4,250 hertz, and most preferably about 4,000 hertz; as mentioned above. The golf club head in accordance with the current invention may generally have a total volume of greater than about 400 cubic centimeters (cc) and less than about 500 cc, more preferably greater than about 420 cc and less than 480 cc, and most preferably about 460 cc. Viewing the numbers above, the first peak frequency to volume ratio relationship may generally be greater than about 7.0 hertz/cc and less than about 15.0 hertz/cc, more preferably greater than about 9.0 hertz/cc and less than about 13.0 hertz/cc, most preferably about 8.0 hertz/cc. The first peak frequency to volume ratio is defined below as Equation (4).

$$\text{First Peak Frquency to Volume Ratio} = \frac{\text{First Peak Frequency}}{\text{Volume}} \quad \text{Eq. (4)}$$

In addition to the weight savings from the striking face of the golf club head and the improved acoustic performances described above, the utilization of a pocket that is filled with a second material having a second density yields an additional advantage in creating a golf club that can hit a golf ball further by increasing the Characteristic Time (CT) of the golf club head. CT, as currently known in the golfing industry, may generally relate to the amount of time a pendulum contacts the striking face of a golf club head after being dropped from various height that simulates different velocities. The velocity and time values, captured by an accelerometer attached to the pendulum, are then generally plotted against a function of the velocity. A linear trend line having a specific slope may be formed by the various data points, and the ultimate y-intercept may yield the CT value of the golf club head. More details regarding the exact apparatus and procedure used to acquire the CT value of a golf club head may be found in U.S. Pat. No. 6,837,094 to Pringle et al ('094 Patent), the disclosure of which is incorporated by reference in its entirety.

Figure 10:
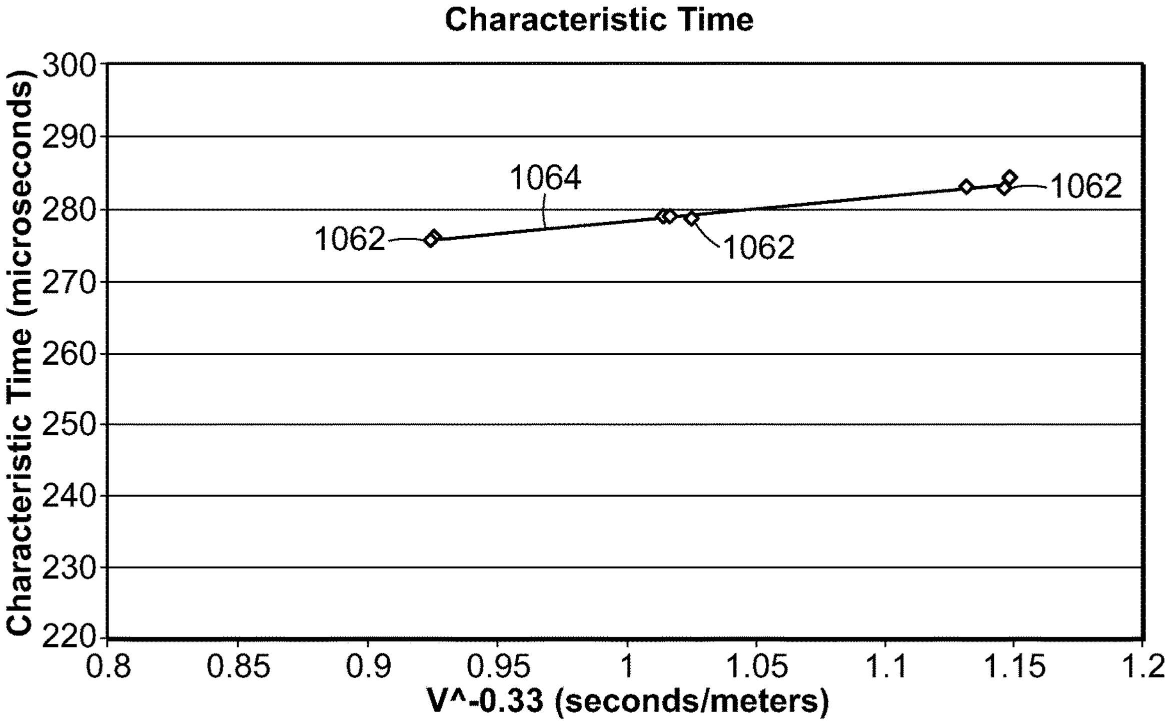
FIG. 10 shows characteristic time plots of the various data collected from an exemplary inventive golf club head in accordance with the USGA CT test.

FIG. 10 of the accompanying drawings shows a graphical representation of the various contact time results taken using the portable apparatus for measuring the flexibility of the striking face of a golf club head according to the steps described in the '094 Patent. More specifically, FIG. 10 shows the characteristic time results of the striking face of an exemplary golf club head in accordance with the current invention being plotted on the y-axis against the velocities of the pendulum at each of the respective data points 1062 being plotted on the x-axis. It should be noted that the velocities of the pendulum taken by an accelerometer attached to the pendulum is taken to an exponent value of −0.329 in order to minimize the expected errors on the intercept value to create a linear relationship quantified by the Equation (5) below.

$$T = A + BV^{-k} \quad \text{Eq. (5)}$$

Wherein T equals the time for the velocity of the pendulum to rise from 5% to 95% of the maximum velocity recorded, B is the slope of the trend-line 1064 formed by the various data points 1062, V is the velocity of the pendulum test at the various data points 1062, and k is the exponential adjustment factor to minimize the error in the intercept value of the golf club head. The intercept between the trend-line 1064 and the y-axis, identified here as A, can be determined from the T, B, and V values above and may generally be the ultimate CT values used by the USGA which correlates to the ability of the golf club head to flex during impact with a golf ball.

It is worth noting here that, because the CT value here is determined based on the intercept A, the slope B of the trend-line 1064 formed by the various CT results of each individual data point 1062 from the pendulum test is an important factor that greatly affects the CT value. Because the current invention's utilizes a specific amount of composite that has a lowered second density within the pocket at the striking face portion of the golf club, the slope B of the trend-line 1064 created by the various data points may generally be steeper than the slope of a traditional prior art golf club head. More specifically, the slope formed from the trend-line 1064 of the various data points 1062 may be known here at the "characteristic time slope". The "characteristic time slope", as defined in the current invention above, may generally be greater than about 5 and less than about 50, more preferably greater than about 10 and less than about 45, even more preferably greater than about 12.5 and less than about 30, and most preferably greater than about 15 and less than about 20 as shown in FIG. 10. Although the units of the slope of the characteristic time slope trend-line 1064 is not specifically discussed above, it can may generally be derived by dividing the units for the time in microseconds by the value of the velocity to the −0.33 power. The end results of the unit for the trend-line 1064 may generally be (microseconds/(seconds/meters)) or any other simplified form of that equation all without departing from the scope and content of the present invention. More information regarding the CT test, as defined and performed by the United States Golf Association (USGA), can be found in the Technical Description of the Pendulum Test, Revised Version, Discussion of Points Raised During Notice & Comment Period (November 2003), the disclosure of which is incorporated by reference in its entirety.

Figure 11:
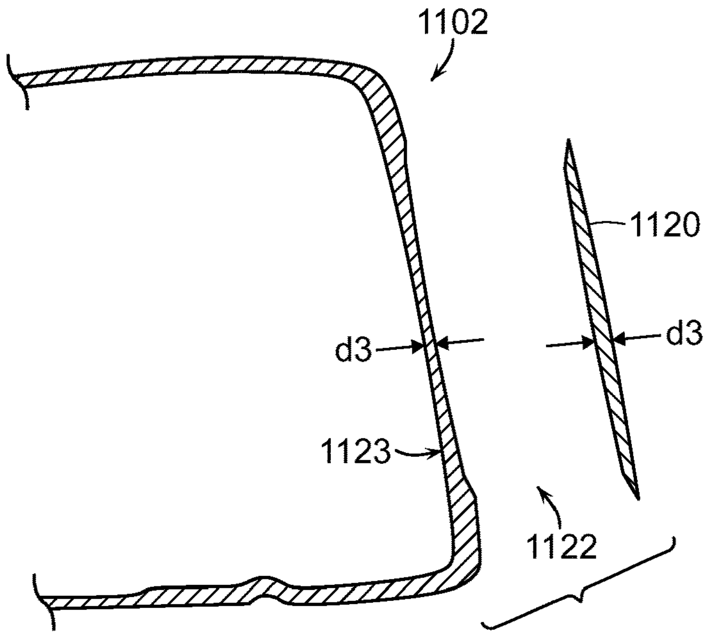
FIG. 11 shows an enlarged cross-sectional view of the golf club head focusing on the striking face portion of the golf club head in accordance with a further alternative exemplary embodiment of the present invention.

Returning to our previous discussion regarding the various geometries that can be used to create the pocket within the striking face portion of the golf club head we now turn to FIG. 11. FIG. 11 of the accompanying drawings shows a cross-sectional view of a golf club head having a pocket 1122 that may have a concave geometry. Although the concave geometry may decrease the thickness of the backing portion 1123, the thinner back portion 1123 may offer additional deflection of the entire striking face 1102, which could result in an increase in the performance of a golf club head. The thickness of the pocket 1122 may generally be shown in FIG. 11 as d3, which could vary from about 0.2 mm to about 3.5 mm all without departing from the scope and content of the present invention.

Figure 12:
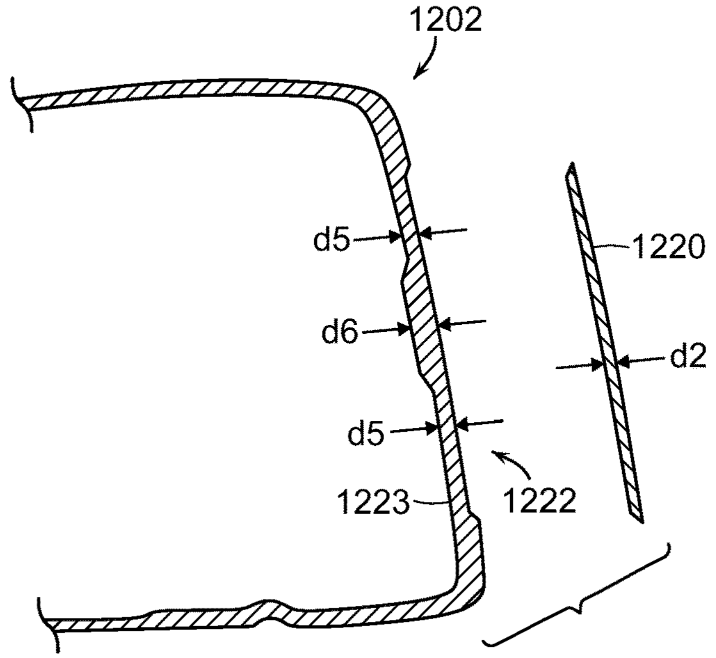
FIG. 12 shows an enlarged cross-sectional view of the golf club head focusing on the striking face portion of the golf club head in accordance with a further alternative exemplary embodiment of the present invention.

FIG. 12 of the accompanying drawings shows a cross-sectional view of a golf club head having a pocket 1222 in accordance with a further alternative embodiment of the present invention. More specifically, the backing portion 1223 of this pocket 1222 may have a variable thickness, to promote a bigger sweet spot without affecting the geometry of the insert 1220 within the pocket 1222. More detailed discussion on the benefits of having a golf club head with a striking face that has a variable thickness may be found in U.S. Pat. No. 6,605,007 to Bissonnette et al, the disclosure of which is incorporated by reference in its entirety. The backing portion 1223 in accordance with this exemplary embodiment of the present invention may have two different thicknesses d5 and d6, with the thicker portion d6 located near the center of the striking face 1202. Despite the above, numerous other variations of this thickness profile with more distinct sections may be used all without departing from the scope and content of the present invention, so long as the backing portion has a variable thickness. Finally, it is worth noting that the thickness of the pocket 1222 and the thickness of the face insert 1220 may all be substantially unchanged at a constant thickness of d2 also without departing from the scope and content of the present invention.

Figure 13:
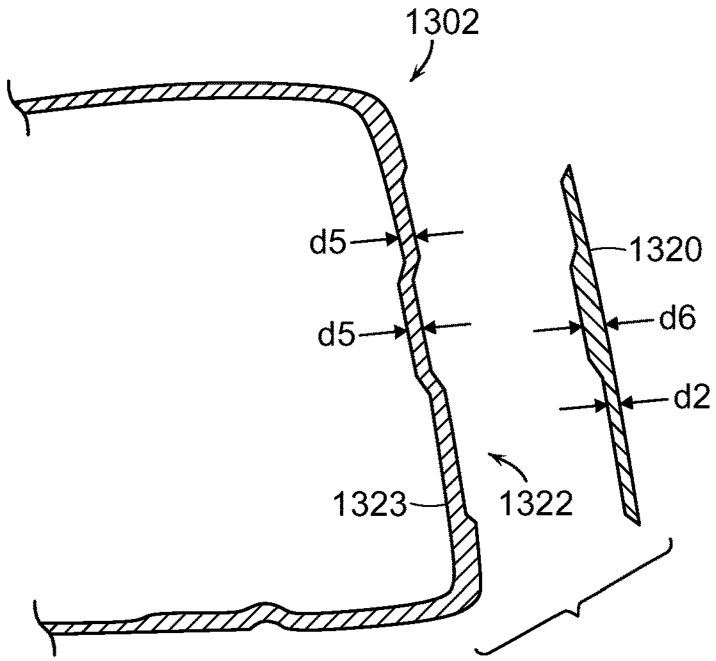
FIG. 13 shows an enlarged cross-sectional view of the golf club head focusing on the striking face portion of the golf club head in accordance with a further alternative exemplary embodiment of the present invention.

FIG. 13 of the accompanying drawings shows a cross-sectional view of a golf club head having a further alternative geometry for the pocket 1322 and the face insert 1320 in accordance with a further alternative embodiment of the present invention. More specifically, the face insert 1320 in this exemplary embodiment of the present invention may have a variable thickness to improve the performance of the striking face 1320 of the golf club head. In order to accommodate this variable thickness on the face insert 1320, the backing portion 1323 may maintain a constant thickness to accommodate the variable thickness of the face insert 1320. In order to maintain the constant thickness of the backing portion 1323, this alternative embodiment of the present invention may generally yield a backing portion 1323 that has a bend near the central portion of the backing portion 1323 to match the thickened portion of the face insert 1320.

Figure 14:
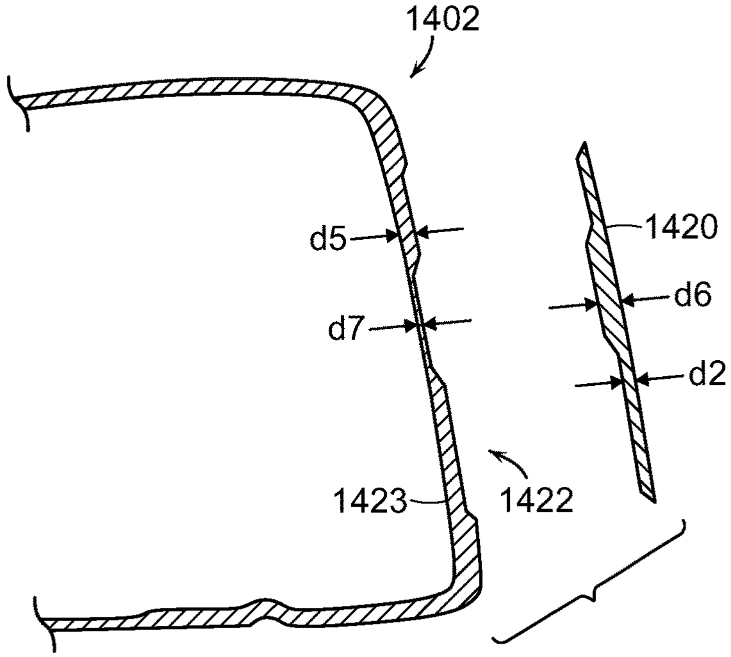
FIG. 14 shows an enlarged cross-sectional view of the golf club head focusing on the striking face portion of the golf club head in accordance with a further alternative exemplary embodiment of the present invention.

FIG. 14 of the accompanying drawings shows a cross-sectional view of a golf club head having a further alternative geometry for the pocket 1422 as well as the face insert 1420 in accordance with a further alternative embodiment of the present invention. More specifically, the face insert 1420 in this exemplary embodiment of the present invention may have a variable thickness to improve the performance of the striking face 1420 of the golf club head. The backing portion 1423, provides an alternative way to provide support to the face insert 1420 in providing a variable thickness that gets thinner at the central portion of the striking face 1402. This embodiment may be preferred to provide more flexural stiffness of the central portion as a thinner central portion may provide more deflection.

Figure 15:
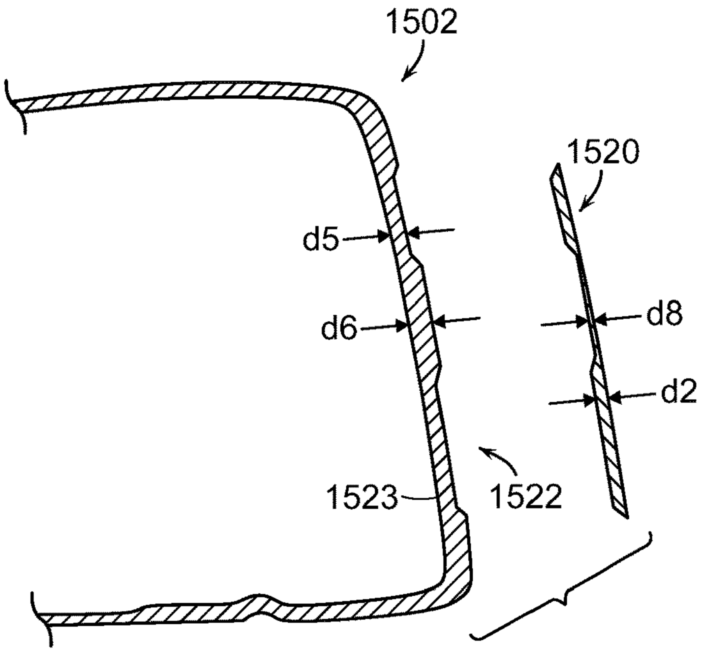
FIG. 15 shows an enlarged cross-sectional view of the golf club head focusing on the striking face portion of the golf club head in accordance with a further alternative exemplary embodiment of the present invention.

FIG. 15 of the accompanying drawings shows a cross-sectional view of a golf club head having a further alternative geometry for the pocket 1522 as well as the face insert 1520 in accordance with a further alternative embodiment of the present invention. More specifically, this embodiment of the of the present invention will have a backing portion 1523 that has an increased thickness at the central portion of the striking face 1502 to increase the durability of the golf club head. Hence, in order to accommodate the increased thickness of the backing portion 1523 at the central portion of the striking face 1502, the thickness of the face insert 1520 may generally be thinner at central portion. This embodiment may be preferred in situation where the durability of the golf club head needs to be improved.

Figure 16:
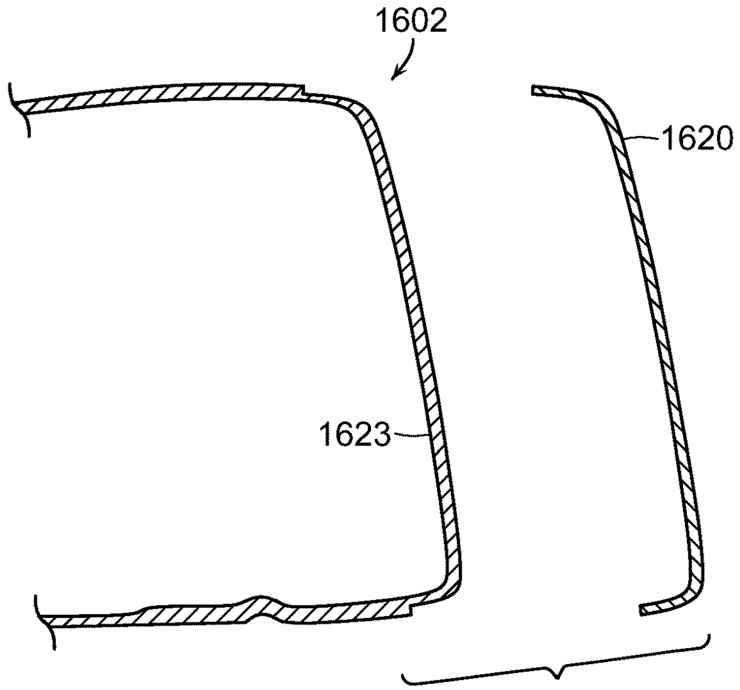
FIG. 16 shows an enlarged cross-sectional view of the golf club head focusing on the striking face portion of the golf club head in accordance with a further alternative exemplary embodiment of the present invention.

FIG. 16 of the accompanying drawings shows a cross-sectional view of a golf club head utilizing a different geometry to form the striking face 1602 in accordance with a further alternative embodiment of the present invention. More specifically, the backing portion 1623 forms a thinner but still complete striking face 1620, only to have it covered by the face insert 1620. This face insert 1620, although not conventional in size, serves the same purpose of removing unnecessary weight away from the striking face 1602 portion of the golf club head. This embodiment of the present invention provides advantages over prior art golf club heads in that it removes unnecessary weight away from the striking face 1602 of the golf club head while maintaining the structural integrity of the backing portion 1623 without departing form the scope and content of the present invention.

Figure 17:
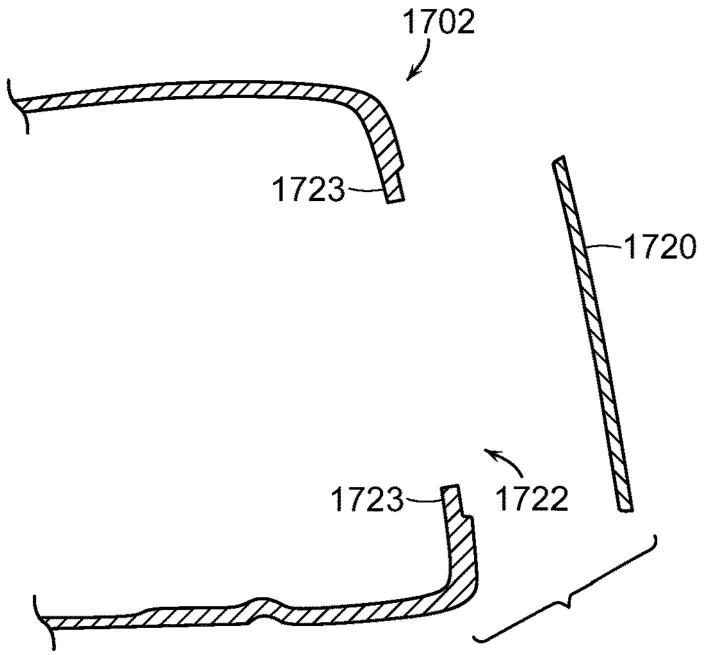
FIG. 17 shows an enlarged cross-sectional view of the golf club head focusing on the striking face portion of the golf club head in accordance with a further alternative exemplary embodiment of the present invention.

FIG. 17 of the accompanying drawings shows a cross-sectional view of a golf club head utilizing a slightly different geometry to form the striking face 1702 in accordance with a further alternative embodiment of the present invention. More specifically, this embodiment of the present invention will utilize two separate backing portions 1723 at opposite ends of the striking face 1702 leaving face insert 1720 unsupported at the central region. This alternative embodiment of the present invention may help completely eliminate the weight that's associated with a full backing portion 1723, further reducing the unnecessary weight associated with the striking face 1702 of the golf club head.

Figure 18:
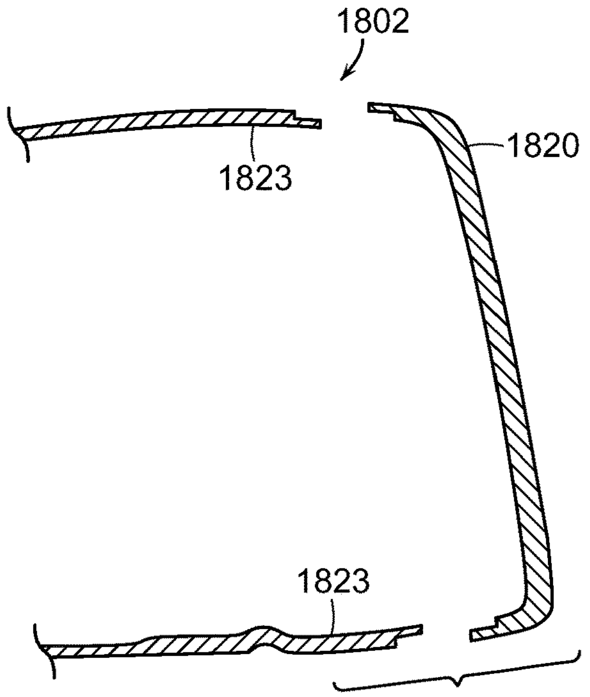
FIG. 18 shows an enlarged cross-sectional view of the golf club head focusing on the striking face portion of the golf club head in accordance with a further alternative exemplary embodiment of the present invention.

FIG. 18 of the accompanying drawings shows a cross-sectional view of a golf club head utilizing a different geometry to form the striking face 1802 in accordance with a further alternative embodiment of the present invention. This embodiment of the present invention shown in FIG. 18, in order to remove shift the bonding points away from the impact portion of the striking face 1802, has shifted the perimeter of the face insert 1820 towards the crown and sole portion of the golf club head. The shift of the bonding points away from the striking face 1802 is beneficial to the performance of the golf club head in that it moves the joints away from the points of the highest stress, decreasing the bonding strength required. As it can be seen from FIG. 18, the backing portion 1823 has been shifted towards the crown and sole portion of the golf club head to achieve this objective without departing from the scope and content of the present invention.

Figure 19:
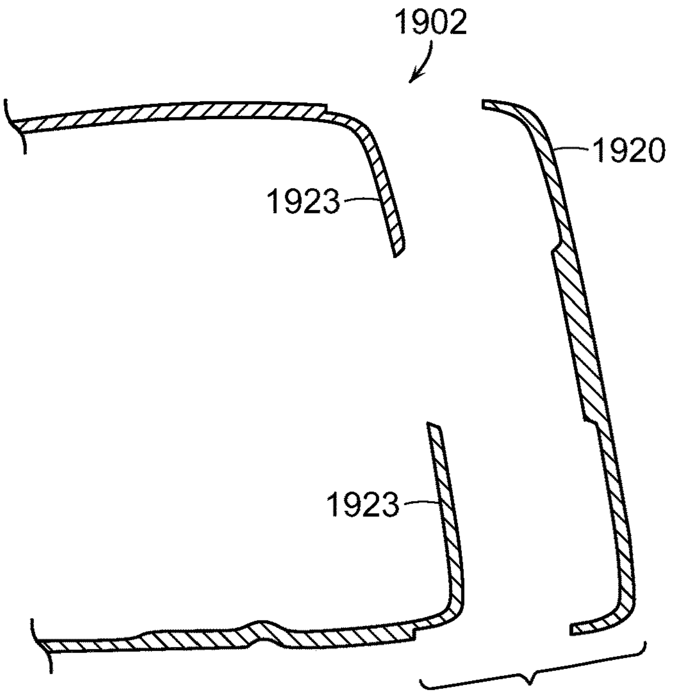
FIG. 19 shows an enlarged cross-sectional view of the golf club head focusing on the striking face portion of the golf club head in accordance with a further alternative exemplary embodiment of the present invention.

FIG. 19 of the accompanying drawings shows a cross-sectional view of a golf club head utilizing a different geometry to form the striking face 1902 in accordance with a further alternative embodiment of the present invention. More specifically, as it can be seen from FIG. 19, the face insert 1920 may wrap around the entire striking face 1902 of the golf club head to shift the joints away from the striking surface of the golf club head. However, the golf club head shown in FIG. 19 provides an additional performance advantage in that the metallic backing portion wraps around to provide partial backing support for the face insert 1920. In addition to the above features, the face insert 1920 shown in this current exemplary embodiment of the present invention may utilize a thickened central portion to improve the size of the sweet spot without departing from the scope and content of the present invention.

It is worth noting here that the golf club heads shown FIGS. 17-19 are a little different from the earlier discussion of the various embodiments of the present invention in that the pockets created by the golf clubs shown in FIGS. 17-19 do not have a backing portion. In situations where the pocket is supported by a metallic backing portion, the major cause of failure within the various plies of composite type material may be due to the delamination of the individual plies of composite fiber. However, in situations where the pocket is not supported by a backing portion, the major concern becomes the durability of the composite material itself, making the strength and durability of the composite type material a major concern. Despite the fact that almost any kind of resin impregnated carbon fiber may provide significant weight savings benefits, not all types of resin impregnated carbon fiber can meet the durability requirements needed to be used in a golf club head. In order to understand the different types of resin impregnated carbon fiber, it may be helpful to turn to FIG. 20 of the accompanying drawing showing a stress and strain chart 2000 of the fibers within the carbon fiber impregnated fiber that helps illustrate the relationship between the stress and the strain values of such a resin impregnated carbon fiber material that may be suitable for use as the second material in accordance with the present invention.

Figure 20:
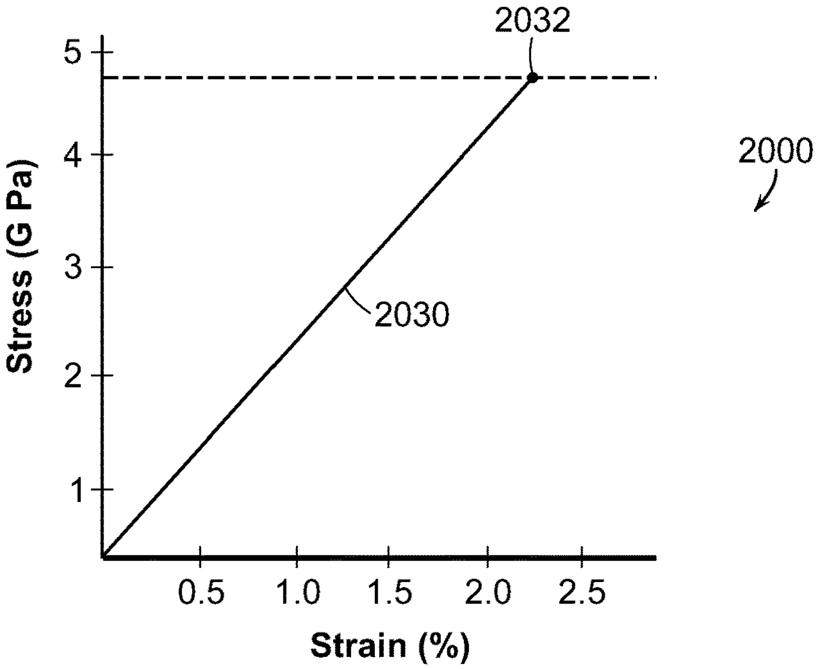
FIG. 20 shows a stress and strain diagram of the fiber within the composite material used to make the face insert in accordance with an exemplary embodiment of the present invention.

First and foremost, looking at the stress and strain chart 2000, we can see that the stress and strain relationship 2030 of the fibers of this composite type material may have linear elastic to failure characteristic. Linear elastic to failure characteristic in the fiber of a composite material may generally be more preferable than non-linear elastic to failure in that it allows for purely elastic deformation that does not alter the physical dimensions of the composite material. This type of purely linear elastic to failure characteristic in the fibers of the composite is more preferable than non-elastic elastic to failure because a brittle fiber that has a linear elastic to failure may generally yield a higher ultimate tensile strength than the yield stress achievable by a brittle fibers that exhibits non-linear elastic to failure characteristics. In addition to showing the linear elastic to failure characteristic of the fiber of the composite material, the stress and strain relationship 2030 of FIG. 20 also shows the strength and modulus of an ideal fiber for the composite material used for the current invention. More specifically, FIG. 20 shows that the fibers of the composite material used may generally have a tensile strength of greater than about 4.0 Gpa and less than about 6.0 GPa, more preferably greater than about 4.5 GPa and less than about 5.5 GPa, and most preferably about 4.9 GPa. Paired with the tensile strength articulated above, the composite material may generally have a tensile modulus of elasticity, determined by the slope of the stress and strain relationship 2030, of greater than about 200 GPa and less than about 300 GPa, more preferably greater than about 225 GPa and less than about 275 GPA, and most preferably about 241 GPa. It is worth noting here that although the tensile strength and tensile modulus are all important characteristics of the fibers of the composite material, the key determinant on what makes the fiber suitable for the current invention will hinge on the strain to failure percentage. The strain to failure percentage, as referred to in the current exemplary embodiment, may generally be defined as the tensile strength of the fiber divided by the tensile modulus of elasticity of the fiber, as more specifically articulated in Equation (6) below.

$$\frac{\text{Tensile Strength}}{\text{Tensile Modulus of Elasticity}} = \text{Strain to Failure Percentage} \qquad \text{Eq. (6)}$$

The strain to failure percentage, as shown in the current exemplary embodiment in FIG. 20, and based on the tensile strength and tensile modulus of elasticity number above, may generally be greater than about 1.0% and less than about 10.0%, more preferably greater than about 2.0% and less than about 8.0%, and most preferably about 2.5%.

Figure 21:
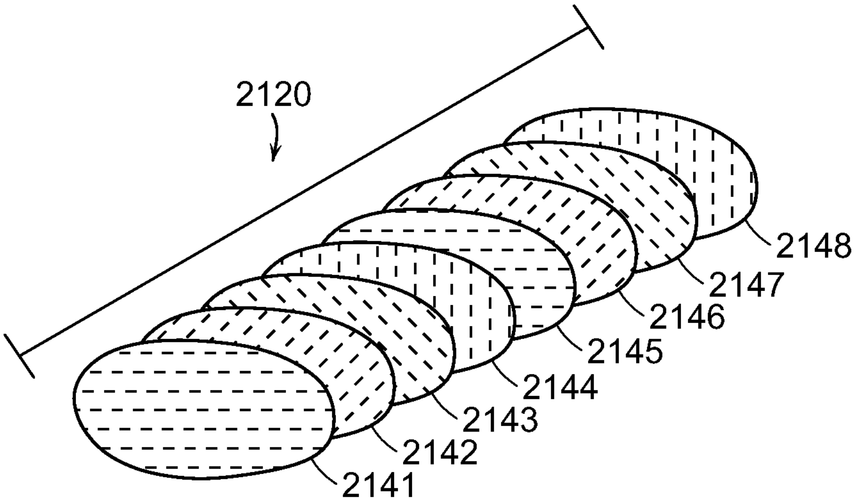
FIG. 21 shows an exploded perspective view of a particular type of fiber orientation used to construct the face insert in accordance with an exemplary embodiment of the present invention.

Continuing the discussion about utilizing a composite material to form the face insert, FIG. 21 of the accompanying drawings shows an exploded view of a composite face insert 2120 in accordance with an exemplary embodiment of the present invention. More specifically, the exploded view of the face insert 2120 allows a better view of how the various orientations of the fiber within the composite face insert 2120 may be altered to affect the performance characteristics of the golf club head. The face insert 2120 shown in FIG. 21 may generally have a first layer 2141, a second layer 2142, a third layer 2143, a fourth layer 2144, a fifth layer 2145, a sixth layer 2146, a seventh layer 2147, an eight layer 2148, or any number of layers deemed to be needed to construct the face insert 2120 all without departing from the scope and content of the present invention. In this current exemplary embodiment shown in FIG. 21, the face insert 2100 may have eight different layers, 2141, 2142, 2143, 2144, 2145, 2146, 2147, and 2148, each with a fiber orientated in a different orientation than the layer it immediately engages. More specifically, first layer 2141 may have the fibers orientated in a horizontal direction labeled as 0 degrees for ease of reference. Second layer 2142 may follow the first layer 2141 with fibers orientated in a diagonal direction more easily identified as +45 degrees. Third layer 2143 may follow the second layer 2142 with fibers orientated in a vertical direction more easily identified as 90 degrees. Fourth layer 2144, may follow the third layer 2143 with another layer of fibers orientated in a diagonal direction different from the second layer 2142, more easily identified as −45 degrees. Although eight different layers are shown in FIG. 21, subsequent layers 2145, 2146, 2147, and 2148 in this exemplary embodiment may follow the same orientation as the first four layers. In fact, any additional number of layers may be added in addition to what is shown in FIG. 21 to reach the required thickness without departing from the scope and content of the present invention, so long as it follows the structure set forth above in FIG. 21. Having this type of orientation may yield a composite face insert 2120 that has quasi-isotropic properties resulting in a face insert 2120 that is sufficiently strong enough to be able to withstand loads orientated in numerous different directions without failing.

Figure 22:
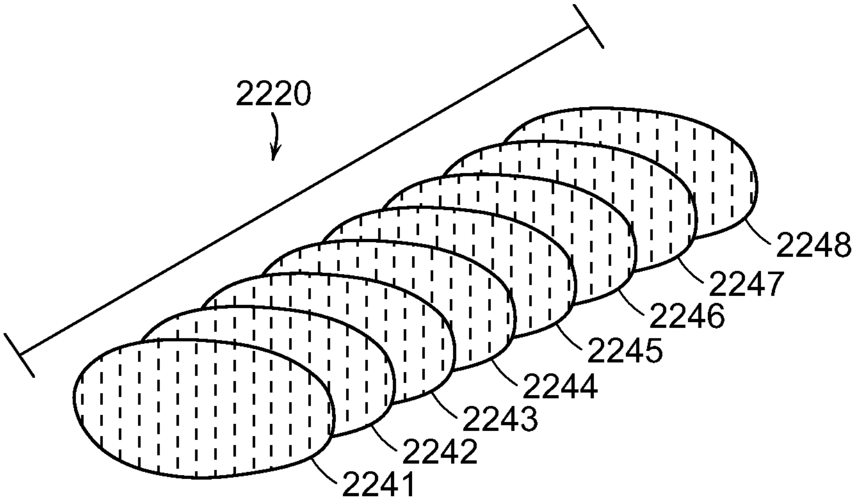
FIG. 22 shows an exploded perspective view of a different type of fiber orientation used to construct the face insert in accordance with a different exemplary embodiment of the present invention.

FIG. 22 of the accompanying drawings shows a further alternative embodiment of the present invention wherein the face insert 2220 exhibit anisotropic properties. Anisotropy, as used in this current exemplary embodiment, refers to the directionally dependent strength of the composite face insert 2220 that results from the uniform orientation of the fibers within the composite face insert 2220. More specifically, as it can be seen from FIG. 22, the first layer 2241, the second layer 2242, the third layer 2243, the fourth layer 2244, the fifth layer 2245, the sixth layer 2246, the seventh layer 2247, and the eighth layer 2248 may all have fibers that run in a substantially vertical direction that is more easily identified as the 90 degree direction. Having an anisotropic composite face insert 2220 may further improve the performance of a golf club head by focusing the strength of the face insert 2220 along a direction that is subjected to the most stress while sacrificing some strength along other directions that tends to not generate as much stress. Within the design space of a golf club head, the majority of the stress is generated in a crown-sole direction; hence, by orienting the orientation of the fiber along that opposite direction, the striking face will have an increased modulus in the direction that has the shortest distance to absorb this stress. FIG. 22 only shows eight layers of fiber within the composite face insert 2220 for illustration purposes, however, it should be noted that additional layers may be added to the face insert 2220 to reach the desired thickness of the face insert 2220 without departing from the scope and content of the present invention so long as it follows the structure set forth above in FIG. 22.

In addition to the increased modulus along the desired direction, the face insert 2220 shown in FIG. 22 may also offer an additional performance benefit by reducing the number of plies of composite needed in the less stressed direction that spans from crown to sole, further removing unnecessary weight from the striking face of the golf club head. It should be noted here that although the current discussion relates more specifically to a composite based material being used for the face insert 2220, the same concept of anisotropy may apply to metallic materials such as aluminum, magnesium, or even titanium all without departing from the scope and content of the present invention. More detailed discussion regarding the creation and the use of metallic anisotropy materials may be found in U.S. Pat. No. 6,623,543 to Zeller et al., the disclosure of which is incorporated by reference in its entirety.

Figure 23:
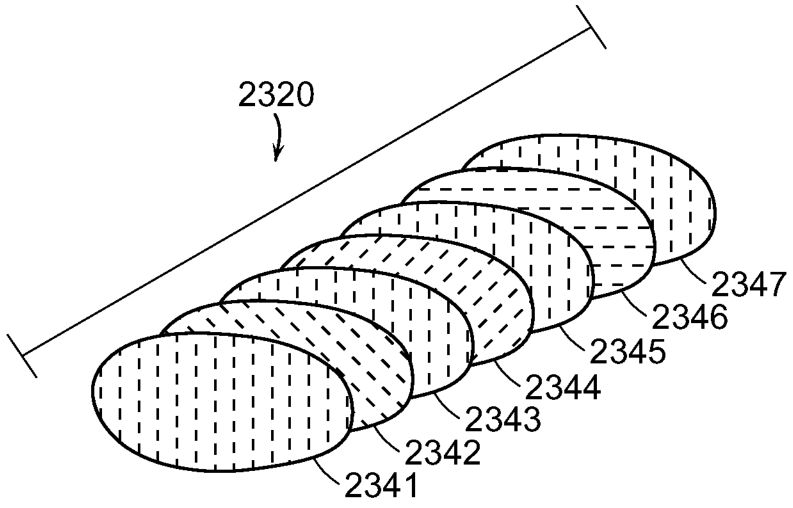
FIG. 23 shows an exploded perspective view of a different type of fiber orientation used to construct the face insert in accordance with a different exemplary embodiment of the present invention.

FIG. 23 of the accompanying drawings shows a further alternative embodiment of the present invention wherein a different combination of fiber orientations yielding a face insert 2320 that is quasi-anisotropic. Quasi-anisotropy, as used in this current exemplary embodiment, refers to the directionally dependent strength of the composite face insert 2320 that results from an orientation of the composite fibers that favors one orientation over another orientation. More specifically, face insert 2320 may have a first layer 2341 with fibers orientated substantially vertical direction that is more easily identified as a 90 degree direction. Positioned behind the first layer 2341 is the second layer 2342 with fibers orientated in a substantially diagonal direction more easily identified as +45 degree. Third layer 2343, being placed behind the second layer 2342 may have its fibers orientated that are similar to the fiber orientation of first layer 2341 being substantially vertical, reinforcing the strength of the face insert 2300 along the crown-sole orientation. Behind the third layer 2343 is a fourth layer 2344 having its fibers orientated in a substantially opposite diagonal direction than that of the second layer 2342. The fourth layer 2344 may have fibers at a −45 degree orientation, signifying that its fiber orientation is perpendicular to that of the second layer 2342. The fifth layer 2345, placed behind the fourth layer 2344, may have its fibers return to a substantially vertical orientation to further increase the strength of the face insert 2320 in the crown sole orientation. The sixth layer 2346, as shown in the current exemplary embodiment, may generally have fibers orientated in a horizontal direction that can more easily identified as being at 0 degrees. Finally, the seventh layer 2347 of the composite face insert 2320 may revert back to having its fiber in the substantially vertical direction to further reinforce the strength along the heel toe direction.

The face insert 2320 shown in FIG. 23 may generally combine the quasi-isotropic benefits of the face insert 420 shown in FIG. 21 with the anisotropic benefits of face insert 520 shown in FIG. 22. More specifically, because the face insert 2320 shown in FIG. 23 has fibers along several different orientations, it may help preserve the flexural stiffness of the face insert 2320 across various directions. However, having a increased number of layers that have fibers running in the vertical orientation allows the face insert 2320 shown in FIG. 23 to have increased the flexural stiffness of the face insert 2320 across the most heavily stressed direction. Once again, it should be noted that although FIG. 23 only shows seven layers of composite fibers, numerous other numbers of layers may be used so long as it follows the structure set forth above in FIG. 23.

It should be noted that although FIGS. 5, and 11-19 all show distinct features and geometries for the face insert in combination with their respective backing portion having their own distinct features and geometries, the various features and geometries of the various components can be interchanged to create different designs and achieve different goals all without departing from the scope and content of the present invention.

Figure 24:
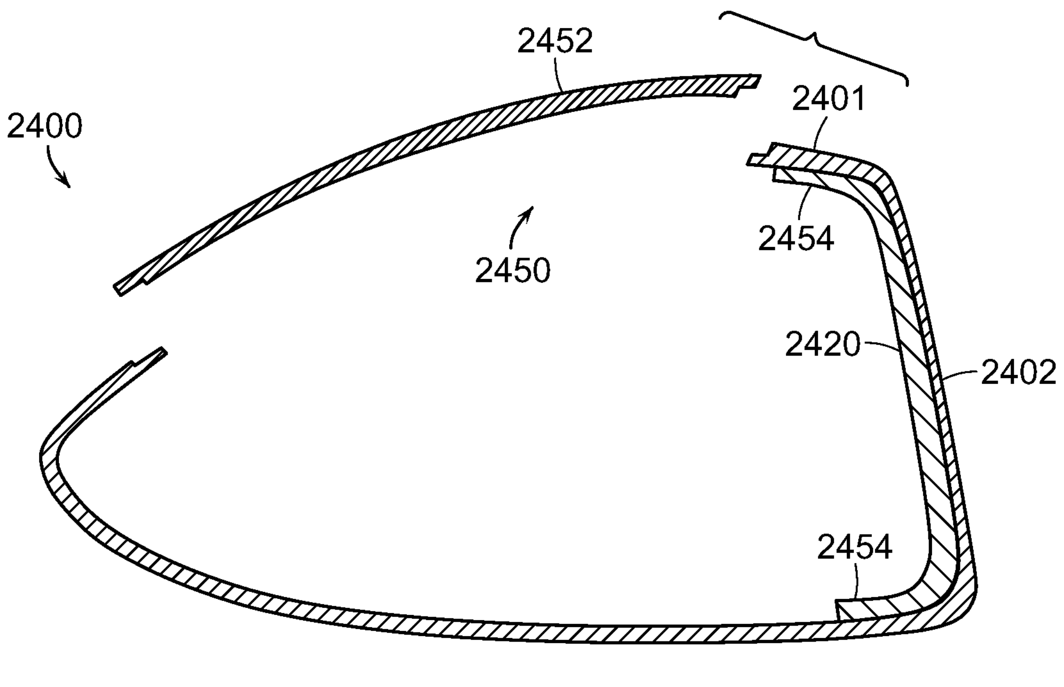
FIG. 24 shows an exploded cross-sectional view of a golf club head in accordance with a further alternative embodiment of the present invention.

FIG. 24 of the accompanying drawing shows an exploded cross-sectional view of a golf club head 2400 in accordance with an alternative embodiment of the present invention taken across cross-sectional line A-A' in FIG. 3, wherein the face insert 2420 is placed behind the inner surface of a thinner striking face 2402 to form a face backing layer 2420. More specifically, FIG. 24 shows a golf club head 2400 being formed out of a hollow unitary shell 2401 with an opening 2450 at a crown portion of the golf club head 2400. This specific type of geometry having an opening 2450 near a crown portion of the golf club head 2400 may generally be known as a "crown pull" construction in the golf industry, as the casting process will involve an insert that is pulled out from the crown portion of the golf club head 2400 to create the opening 2450. However, the opening 2450 may be machined without departing from the scope and content of the present invention, so long as there is an opening 2450 near the crown portion of the golf club head 2400.

The golf club head 2400 shown in FIG. 24 is also shown with a panel 2452 configured to cover the opening 2450 to complete the golf club head 2400. In one exemplary embodiment, the panel 2452 may be formed out of the same material as the hollow unitary shell 2401 to preserve the acoustic characteristics of the golf club head 2400; however, numerous other materials may also be used without departing from the scope and content of the present invention, so long as the panel 2452 is capable of covering the opening 2450

Face backing layer 2420, as shown in this current exemplary embodiment of the present invention, may generally be attached to the rear surface of the thinner striking face 2402 portion of the golf club head 2400 to provide some structural rigidity lost by the thinning of the striking face 2402. Similar to the prior discussions, the replacement of the striking face 2402 with a lightweight material of the face backing layer 2420 will reduce the overall weight of the striking face portion 2402, creating more discretionary weight. Based on the above rationale, the second material used to form the face backing layer 2420 may generally have a second density that is lower than the first density of a first material used to create the hollow unitary shell 2401; resulting in the weight savings described above. In fact, the density of the second material may be may be less than about 2.7 $g/cm^3$ if aluminum is used, less than about 1.738 $g/cm^3$ if magnesium is used, and less than about 1.70 $g/cm^3$ if composite type material is used. In one preferred embodiment of the present invention, the material for the face backing layer 2420 may be a carbon fiber based composite type material for it's high strength and low mass properties.

Because a thinned striking face 2402 may lose a significant amount of structural rigidity, in order for the golf club head 2400 to survive the impact with a golf ball, the face backing layer 2420 needs to replace the amount of structural rigidity that is lost. In addition to the replacement of the structural rigidity, the addition of the face backing layer 2420 may also serve to distribute the impact load away from the localized impact location. Hence, because of the features provided by the face backing layer 2420 above, the thinned striking face 2402 may generally have a thickness of between about 0.25 mm to about 3.00 mm, more preferably between about 0.25 mm to about 1.00 mm, most preferably between about 0.25 mm to about 0.45 mm, all of which is significantly thinner than what the previous durability standards would require. On the flip side, the face backing layer 2420 may generally have a thickness of between about 0.5 mm to about 4 mm, to provide the structural rigidity needed to support the newly thinned striking face 2402.

Although not specifically shown in FIG. 24, it is generally desirable to cover a significant amount of the internal back surface of the striking face 2402 with the face backing layer 2420, as a higher percentage of coverage will equate to a higher structural support that can be provided by the face backing layer 2420. In one exemplary embodiment, the face backing layer 2420 covers greater than about 90% of the internal back surface of the striking face 2402, more preferably greater than about 95%, and most preferably the face backing layer 2420 covers 100% of the internal back surface of the striking face 2402.

Finally, it is worth noting here that the face backing layer 2420 may generally extend into both the crown portion and the sole portion of the golf club head 2400 to provide better structural rigidity and contact surface, increasing the ability of the face backing layer 2420 to strengthen the thinned striking face 2402 without having to add too much unnecessary weight. Although the exact distance of the extension portion is not critical, the length of the extension 2454 may generally be greater than about 3.00 mm, more preferably greater than about 5.00 mm, and most preferably greater than about 7.00 mm, all without departing from the scope and content of the present invention. The length of the extension 2454 may generally be measured from the plane the portion of the face backing layer 2420 that has completely transition onto the either the crown portion or the sole portion in order to accurately determine the length of the extension 2454. Alternatively speaking, the length of the extension 2454 begins at the point where the face backing layer 2420 forms a planar surface that is substantially perpendicular to the striking face plane.

Based on the construction disclosed above, the attachment of the face backing layer 2420 may generally be accomplished using a bladder molding process. The bladder molding process is a common process used to attach composite material to an internal wall of a golf club head by using an expandable bladder to create unique geometries. More specifically, the bladder molding process may generally involve the steps of inserting an inflatable bladder into the golf club head via an opening, inflating the bladder until at least a portion of the bladder pushes upon the face backing layer. Alternatively, speaking, the bladder applies sufficient pressure to the composite face backing layer such that it juxtaposes itself against the internal back surface of the golf club head. Finally, once the composite face backing layer is sufficiently attached to the internal surface of the striking face via conventional bonding processes, the bladder is deflated to allow it to be extracted from the golf club head via the opening. More information regarding the bladder molding process can be found in a commonly owned U.S. Pat. No. 7,281,991 to Gilbert et al., the disclosure of which is incorporated by reference in its entirety.

Figure 25:
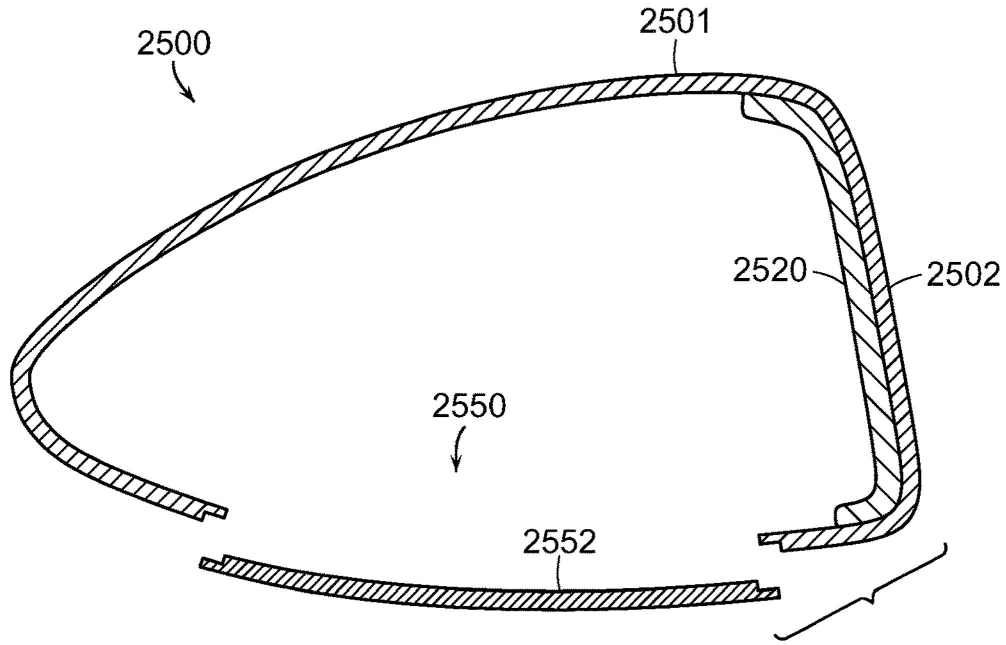
FIG. 25 shows an exploded cross-sectional view of a golf club head in accordance with a further alternative embodiment of the present invention.

FIG. 25 of the accompanying drawings shows an exploded cross-sectional view of a golf club head 2500 in accordance with a further alternative embodiment of the present invention taken across cross-sectional line A-A' in FIG. 3, that incorporates an opening 2550 near a sole portion of the golf club head 2500. Similar to the discussion above, the opening 2550 is part of the hollow unitary shell 2501 and this type of construction shown in FIG. 25 may generally be known as a "sole pull"; as the casting process will involve an insert that is pulled out from the sole portion of the golf club head 2500 to create the opening 2550. However, the opening 2550 may be machined without departing from the scope and content of the present invention, so long as there is an opening 2550 near the sole portion of the golf club head 2500. Similar to the above, the face backing layer 2520 attaches to an internal back surface of the striking face 2502 of the golf club head to provide structural support for the thinned striking face 2502.

Figure 26:
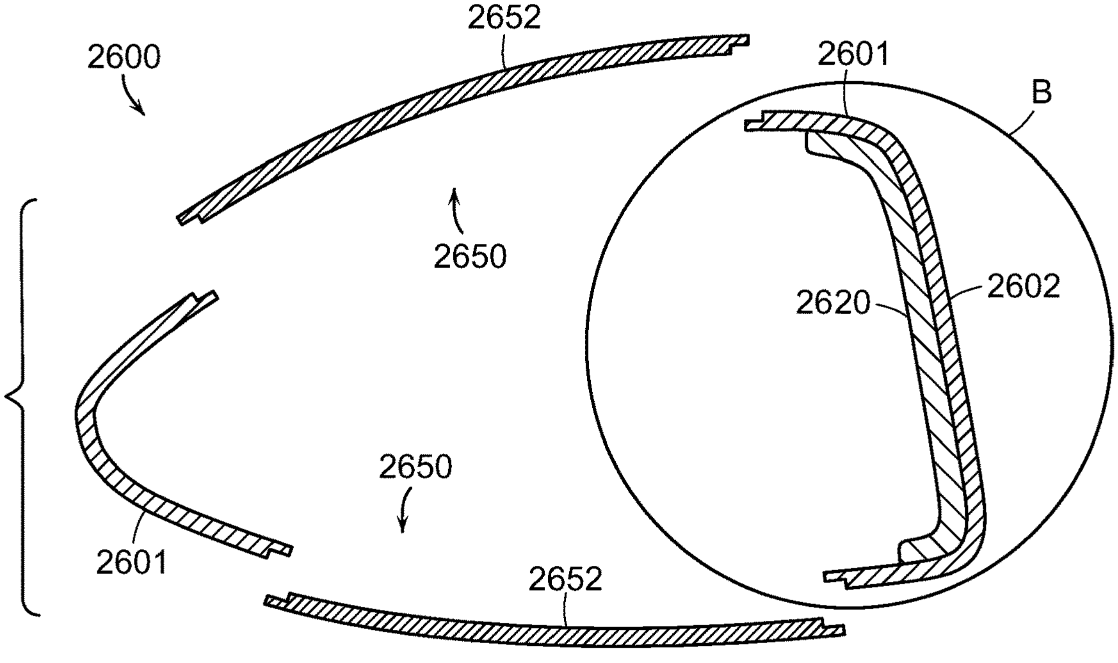
FIG. 26 shows an exploded cross-sectional view of a golf club head in accordance with a further alternative embodiment of the present invention.

FIG. 26 of the accompanying drawings shows an exploded cross-sectional view of a golf club head 2600 incorporating an opening 2650 at both the crown and the sole portion of the golf club head 2600 taken across cross-sectional line A-A' in FIG. 3. The golf club head 2600 is still created using a hollow unitary shell 2601, with the panels 2652 covering the crown and sole openings 2650. In this current exemplary embodiment, the bladder used for bladder molding process can be inserted through either the crown opening 2650 or the sole opening 2650 to provide the internal structure to set the face backing layer 2620 without departing from the scope and content of the present invention.

In a further alternative embodiment of the present invention, golf club head 2600 could be formed with a face cup type geometry at the striking face 2602 portion of the golf club head 2600, eliminating the need for a bladder mold. However, the creation and attachment of the face backing layer 2620 in a face cup geometry will still require pressure to be applied to the face backing layer 2620 to allow the composite material to settle and form without departing from the scope and content of the present invention.

Lastly, FIGS. 27-30 all show enlarged cross-sectional views of the striking face portion of the golf club head as shown in circle B in FIG. 26; allowing the variable face geometry to be created to increase the size of the sweet spot. Without duplicating the discussion above regarding the benefits of variable face geometry, it is worthwhile to note here that the variable face geometry could be accomplished by various thicknesses in both the actual thinned striking face as well as the face backing layer.

Figure 27:
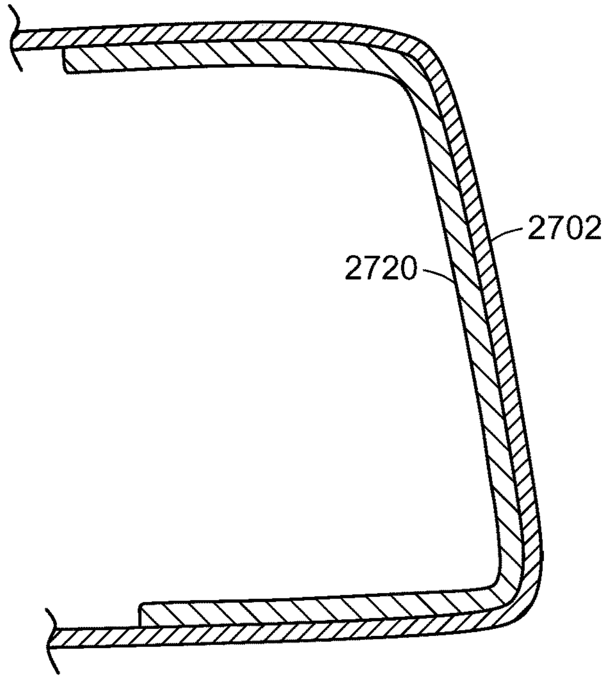
FIG. 27 shows an enlarged cross-sectional view of a the golf club head focusing on the striking face portion of the golf club head in accordance with a further alternative exemplary embodiment of the present invention.

FIG. 27 shows one embodiment of the present invention wherein the thinned striking face 2702 and the face backing layer 2720 is held at a constant thickness. In this specific geometry, the change in flexural stiffness of the striking face 2702 could be accomplished by varying the modulus of the composite fibers of the face backing layer 2720 to achieve that variation without actually adjusting the thickness.

Figure 28:
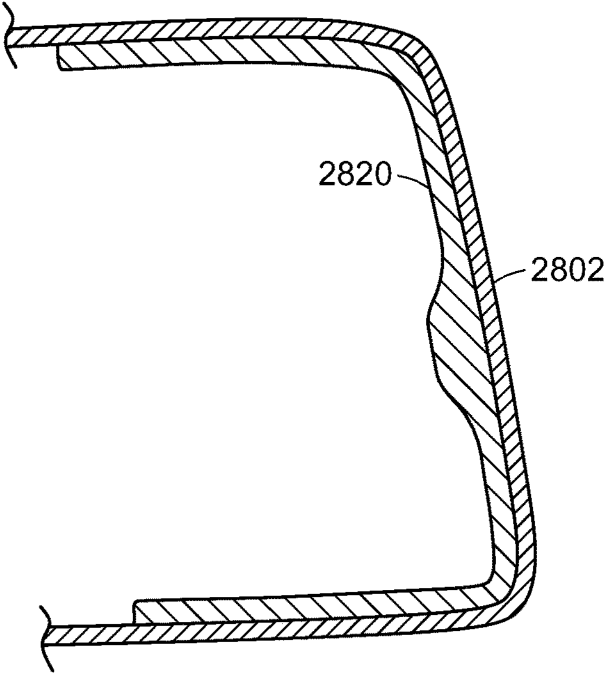
FIG. 28 shows an enlarged cross-sectional view of the golf club head focusing on the striking face portion of the golf club head in accordance with a further alternative exemplary embodiment of the present invention.

FIG. 28 shows another embodiment of the present invention wherein the thinned striking face 2802 has a constant thickness while the face backing layer 2820 has a variable thickness. Ultimately, specific embodiment creates different flexural stiffness at different parts of the golf club head to improve the size of the sweet spot of the golf club head without departing from the scope and content of the present invention.

Figure 29:
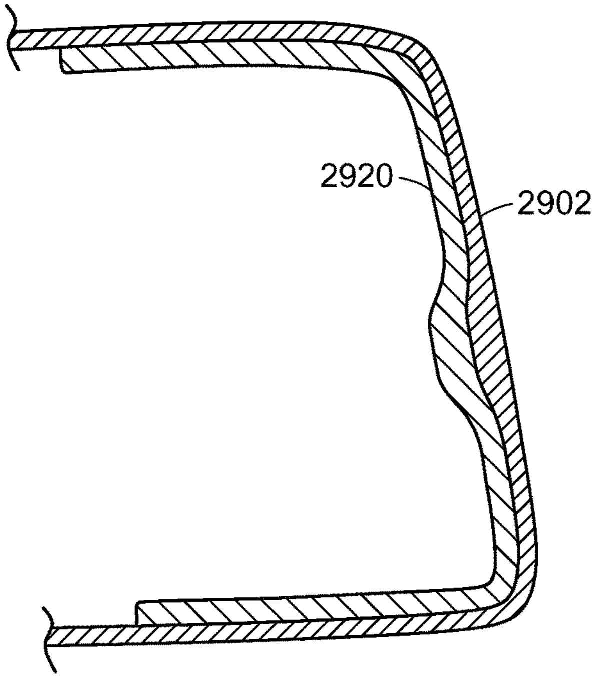
FIG. 29 shows an enlarged cross-sectional view of the golf club head focusing on the striking face portion of the golf club head in accordance with a further alternative exemplary embodiment of the present invention.

FIG. 29 shows another embodiment of the present invention wherein the thinned striking face 2902 has a variable thickness and the face backing layer 2920 has a constant thickness, allowing it to change shape with the contours of the thinned striking face 2902.

Figure 30:
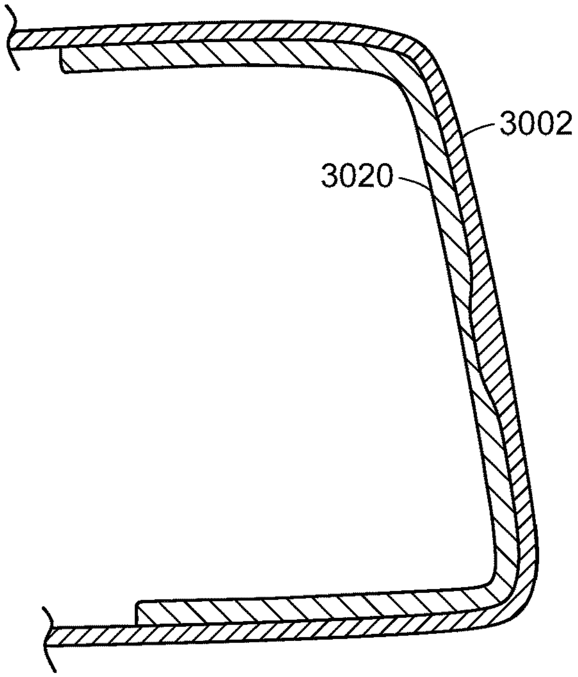
FIG. 30 shows an enlarged cross-sectional view of the golf club head focusing on the striking face portion of the golf club head in accordance with a further alternative exemplary embodiment of the present invention.

FIG. 30 shows another embodiment of the present invention wherein the thinned striking face 3002 has a variable thickness while the face backing layer 3020 also has a variable thickness, creating what appears to be a constant thickness at the internal back surface of the face backing layer 3020.

Figure 31:
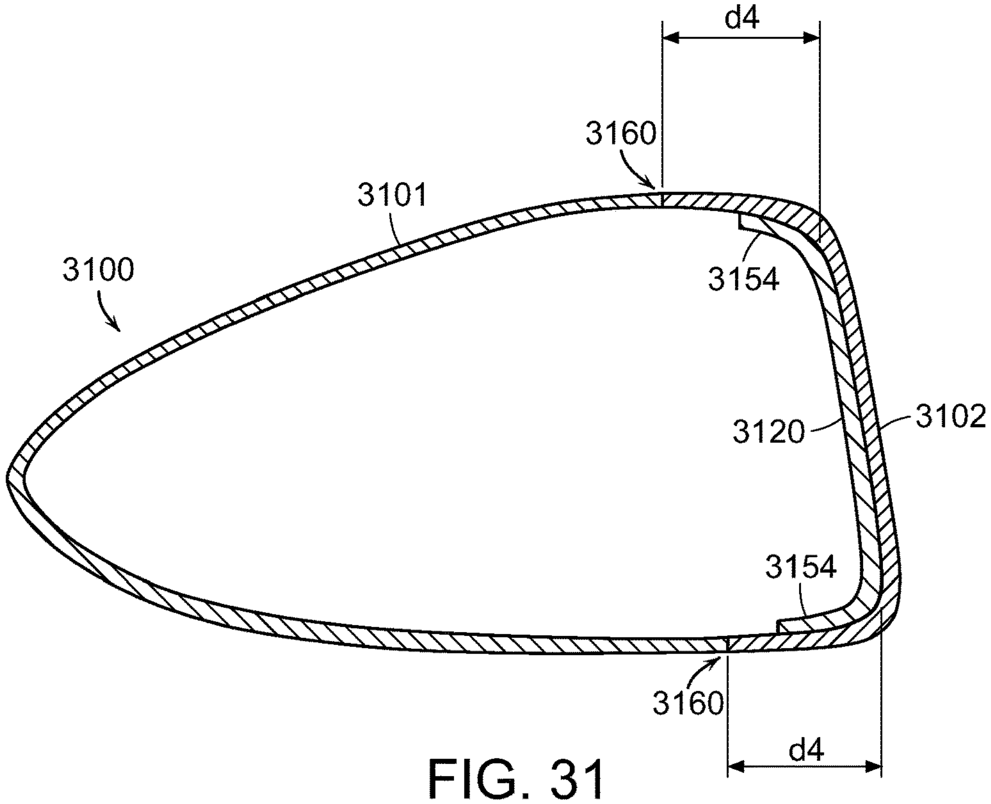
FIG. 31 shows a cross-sectional view of a golf club head in accordance with an alternative embodiment of the present invention.

FIG. 31 of the accompanying drawings shows a cross-sectional view of a golf club head 3100 in accordance with an even further alternative embodiment of the present invention taken across cross-sectional line A-A' in FIG. 3; wherein a backing layer 3120 is placed behind the inner surface of a thinner striking face 3102. In this embodiment, the face backing layer 3120 may generally be made out of a composite material, reinforcing the structural rigidity of the striking face 3102. This increase in structural rigidity allows the actual thickness of the titanium material used in the striking face 3102 to be reduced, removing unnecessary mass from the overall club head itself. It should be noted that in this exemplary embodiment, the composite backing layer 3120 has a flange portion that form the extensions 3154 to help increase the bond between the backing layer 3120 and the striking face 3102. It should be noted that the extensions 3154 in this embodiment terminates short of the ends of the actual striking face 3102 portion, exposing the titanium material to the shell body 3101 to the unitary body shell 3101. This exposure of the titanium striking face 3102 to the titanium unitary body shell 3101 is crucial to the present embodiment because it allows the two components to be welded together without the need for additional bonding. In this current exemplary embodiment, the striking face 3102 and the unitary body shell 3101 are welded together at a face to body joint 3160. The face to body joint 3160 may generally be placed away from the striking plane of the golf club head 3100 in order to remove joints at high stress locations. In one exemplary embodiment of the present invention, the face to body joint 3160 may be placed at a distance d4 of greater than about 10 mm away from the striking face 3102, more preferably greater than about 12.5 mm away from the striking face 3102, and most preferably greater than about 15 mm away from the striking face 3102. Alternatively speaking, the return portion of the striking face 3102 may have a distance d4.

Figure 32:
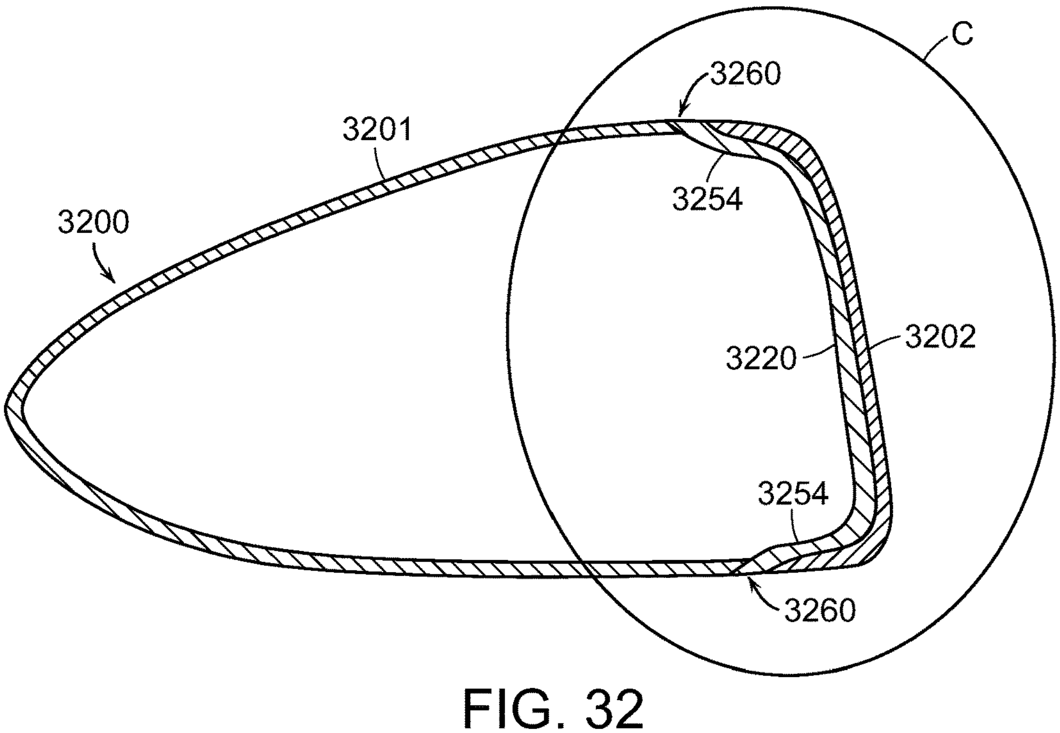
FIG. 32 shows a cross-sectional view of a golf club head in accordance with a further alternative embodiment of the present invention.

FIG. 32 of the accompanying drawings shows a cross-sectional view of a golf club head 3200 in accordance with a further alternative embodiment of the present invention. In this alternative embodiment of the present invention, the backing layer 3220 that is generally made out of a composite type material may extend pass the face return into the face and body joint 3260 portion of the golf club head to connect the frontal striking 3202 to the unitary shell body 3201. It should be noted that in this exemplary embodiment, the face to body joint 3260 may utilize a lap joint instead of the traditional butt joint shown in earlier embodiments of the present invention. To further illustrate the face to body joint 3260, an enlarged cross-sectional view of circular region C is provided in FIG. 33.

Figure 33:
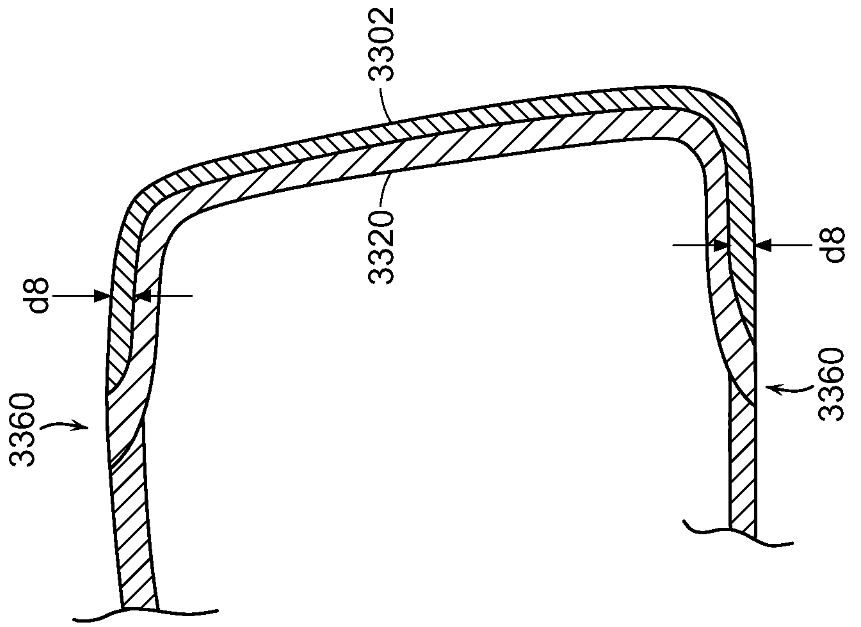
FIG. 33 shows an enlarged cross-sectional view of the striking face portion of a golf club head in accordance with the alternative embodiment of the present invention shown in FIG. 32.

FIG. 33 of the accompanying drawing shows an enlarged cross-sectional view of the face and body joint 3360 together with the striking face 3302 as well as the backing layer 3320. Here, in this enlarged view it can be seen that the backing layer 3320 may be used as part of the lap joint construction to join together the different parts of the golf club head. Having a lap joint at the face and body joint 3360 portion may be preferred over butt joints, as the lap joints may help further distribute the impact stresses of the golf club head with a golf ball. Moreover, because the backing layer 3320 may generally be comprised out of a composite type material, the directional strength of the composite can be designed into the construction to improve the bond strength.

In addition to illustrating the lap joint construction of the face to body joint 3360, FIG. 33 of the accompanying drawings also illustrate the thickness d8 of the return portion of the striking face 3302. In order to maintain a more flexible joint to further eliminate the stresses associated with a golf ball impact, the thickness d8 of the return portion of the metallic striking face 3302 may generally be less than about 0.1 mm, more preferably less than about 0.8 mm, and most preferably less than about 0.7 mm to create a flexible joint. The creation of such a flexible joint may not only help eliminate stress raisers at the face to body joint 3360, but could also improve the performance and compliance of the striking face 3302 itself by allowing the striking face 3302 to flex more upon impact with a golf ball.

Another interesting feature of the present invention shown in FIG. 33 worth highlighting is the elimination of any hard step and junctions at the face to body joint 3360 portion of the golf club head. As previously mentioned, this face to body joint 3360 may generally be subjected to high stress when impacting a golf ball, hence the elimination of any hard step and junctions of that sort will eliminate any issues associated with increased stress of the face to body joint 3360.

Figure 34:
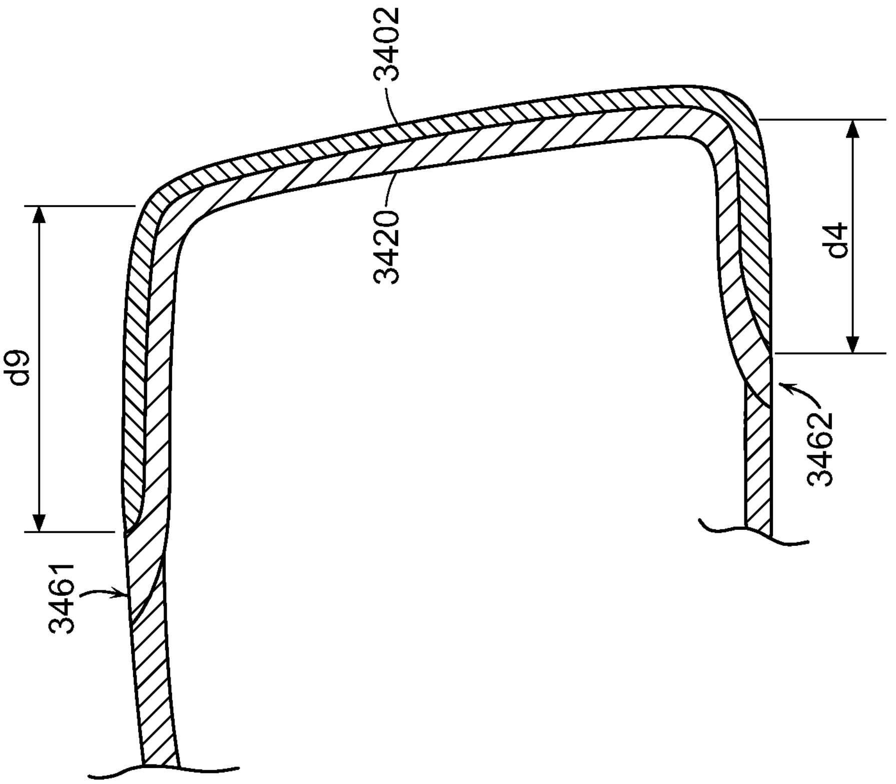
FIG. 34 shows an enlarged cross-sectional view of the striking face portion of a golf club head in accordance with an even further alternative embodiment of the present invention.

FIG. 34 of the accompanying drawings shows an enlarged cross-sectional view of a striking face 3402 portion of the golf club head in accordance with a further alternative embodiment of the present invention. More specifically, in this embodiment, the crown face to body joint 3461 and the sole face to body joint 3462 may be placed at different distances from the striking face 3402. In this embodiment, the crown face to body joint 3461 distance d9 may generally be greater than about 25 mm, more preferably greater than about 27.5 mm, and most preferably about 30 mm. Alternatively speaking, distance d9 may also refer to the crown return portion of said striking face 3402. While, the distance of the sole face to body joint 3462 may maintain the same distance d4 of greater than about 10 mm away from the striking face 3102, more preferably greater than about 12.5 mm. It should be noted that in this exemplary embodiment, the distance of d4 is always less than the distance d6 in order to create the difference in the stress levels between the crown and sole portion of the golf club head. In order to further illustrate this difference in crown face to body joint 3461 location, a top view of the golf club head is provided in FIG. 35.

Figure 35:
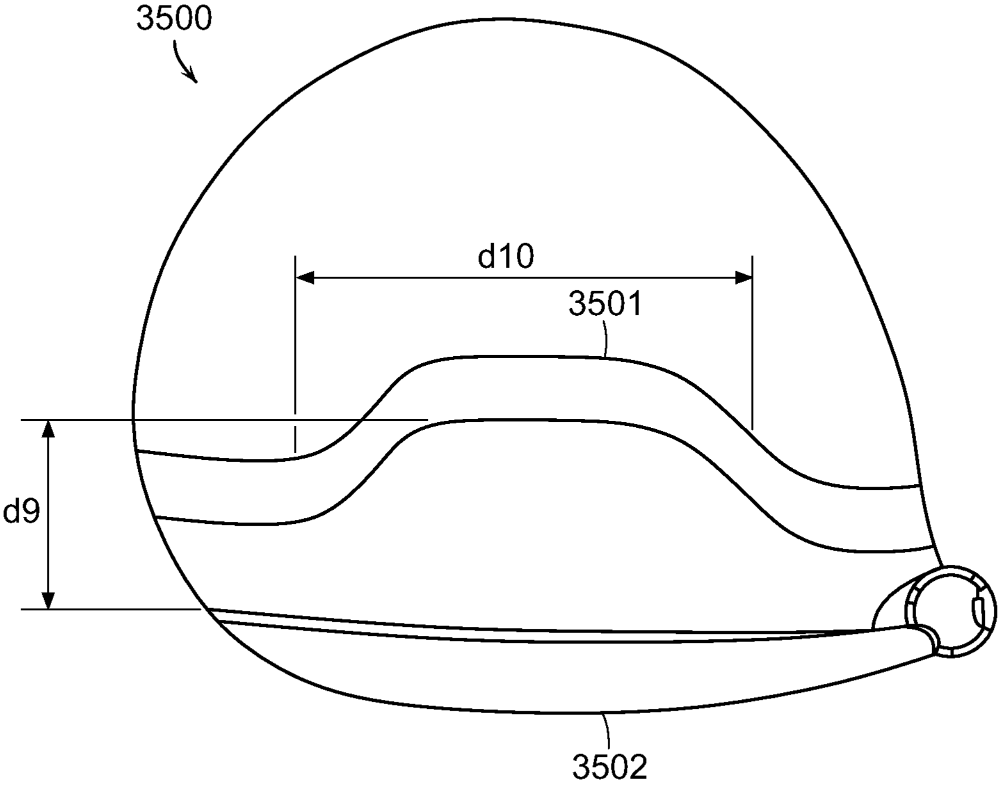
FIG. 35 shows a top view of a golf club head in accordance with the alternative embodiment of the present invention shown in FIG. 34.

FIG. 35 of the accompanying drawings shows a top view of a golf club head 3500 in accordance with the alternative embodiment of the present invention shown in FIG. 34. More specifically, this view allows the shape and geometry of the crown face to body joint 3561 to be shown more clearly. In addition to illustrating the distance d9 depth of the offset from the striking face 3502, FIG. 35 also shows the width d10 of the offset face to body joint 3561 at the central portion of the crown of the golf club head 3500. In the current exemplary embodiment, the width d10 may generally be between about 40 mm and about 60 mm, more preferably between about 45 mm and about 55 mm, and most preferably about 50 mm. The rationale behind only recessing the central crown portion of the face to body joint 3561 is because that portion of the golf club head may generally experience the highest level of stress during impact with a golf ball. However, in other embodiments, the recess could occur at the sole portion, the heel portion, the toe portion, or any combination thereof to address the specific high stress levels all without departing from the scope and content of the present invention.

Figure 36:
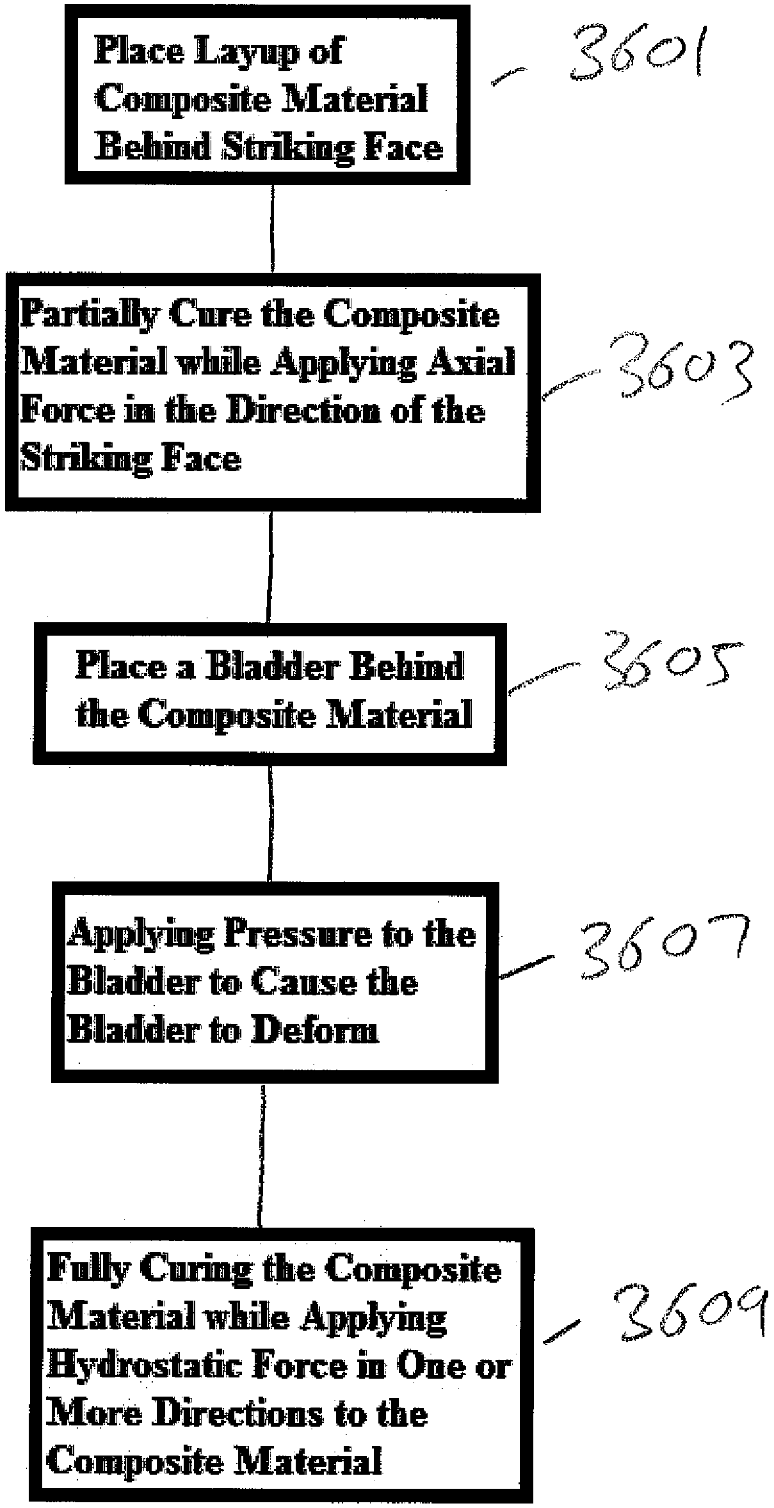
FIG. 36 shows a flow chart of a method of manufacturing a multi-material face of a golf club head in accordance with an exemplary embodiment of the present invention.

FIG. 36 of the accompanying drawings shows a flow chart diagram illustrating a method of manufacture in accordance with an exemplary embodiment of the present invention. In step 3601 one or more layers of composite material is placed behind the striking face of a golf club head within an internal cavity portion of the striking face portion. In this initial step, the layers of composite material may generally have an overall thickness of less than about 3.1 mm, more preferably less than about 3.0 mm, and most preferably less than about 2.9 mm. In addition to the thickness, the fiber orientation of the one or more composite layers is also important to the proper functionality of the present invention.

In one preferred embodiment of the present invention, composite material behind the striking face portion may be formed of a multiple sheets of 0.1 mm prepreg composite in a patterned stacking sequence of (90°, 67.5°, 45°, 22.5°, 0°, −22.5°, −45°, −67.5°) repeated three times combined with one of each layer at the following orientations (90°, 67.5°, 45°, 22.5°, and 0°). Alternatively speaking, the composite layer will have the following number of fibers in each orientation: 90°—four plies, 67.5°—four plies, 45°—four plies, 22.5°—four plies, 0°—four plies, −22.5°—three plies, −45°—three plies, and −67.5°—three plies) for a total of 29 plies. In an alternative embodiment of the present invention, the one or more layers of composite face insert could have a total thickness of between about 27 plies to about 31 plies, more preferably between about 28 plies to about 30 plies, most preferably about 30 plies, all without departing from the scope and content of the present invention. It should be noted that reference to angles used to determine fiber orientation above is based off a circular pattern looking at the frontal portion of the golf club striking face, wherein 0° is shown horizontally in the heel direction of the golf club striking face.

As a result of the orientation described above, it can be said that in a preferred embodiment, the one or more layers of composite material comprises more layers in a positive orientation than in a negative orientation.

Figure 37:
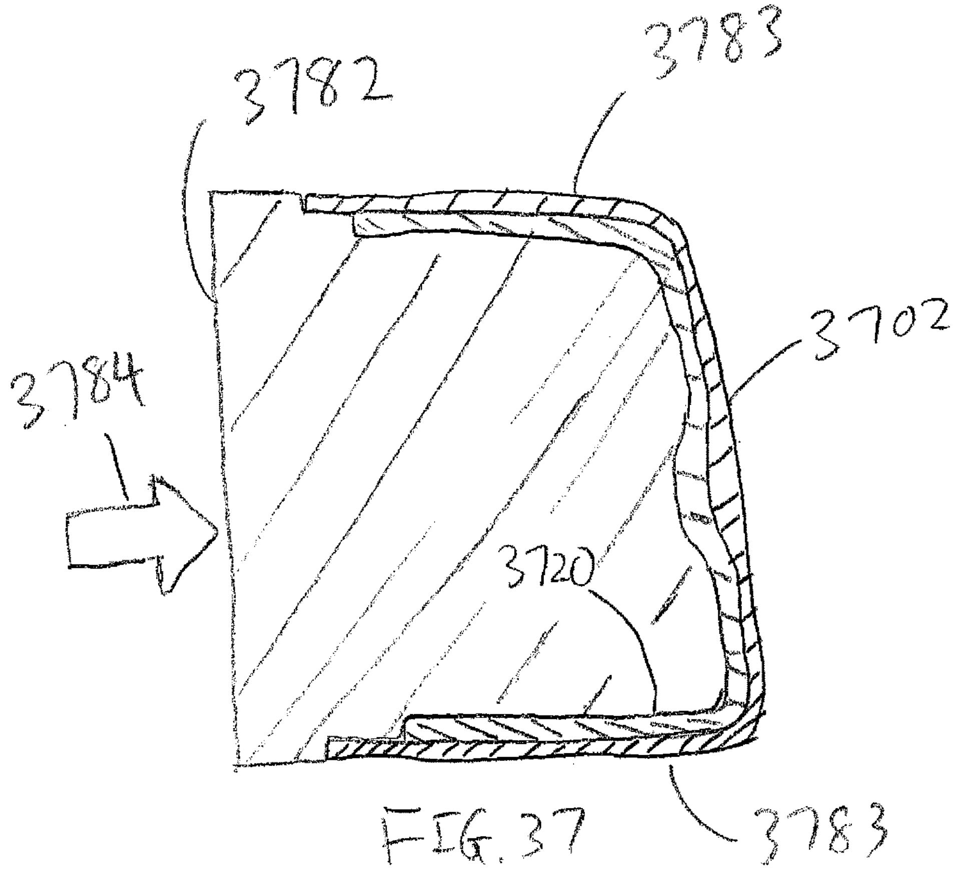
FIG. 37 shows an enlarged cross-sectional view of the striking face portion of a golf club head during the method of manufacturing.

Illustrating the processes involved in step 3601, FIG. 37 shows an enlarged cross-sectional view of the striking face portion of a golf club head in accordance with this alternative embodiment of the present invention. In fact, FIG. 37 also illustrates the process involved wherein the one or more layers of composite material are partially cured in step 3603 while an axial force is applied in the direction of the striking face.

FIG. 37 shows an enlarged cross-sectional view of a golf club head having a striking face portion 3702 as well as a composite face insert 3720 placed behind the striking face portion 3702. It should be noted that in this current exemplary embodiment, the striking face portion 3702 may have a return portion 3783, creating a "C" shaped striking face portion 3702. It can be seen in FIG. 37 that when an axial force 3784 is applied to the one or more layers of composite face insert 3720 behind the striking face portion 3702 via a die 3782, the uni-directional force is not applied in alternate directions such as the return 3783 portion of the striking face 3702. If this was the only step used to ensure proper bonding between the two components, a separation is likely to occur between the striking face portion 3702 and the composite face insert 3720 at or around the return 3783 portion. Alternatively speaking, it can be said that the axial force 3784 is applied only in a direction that is perpendicular to a loft of the striking face 3702 in this step of the method.

Figure 38:
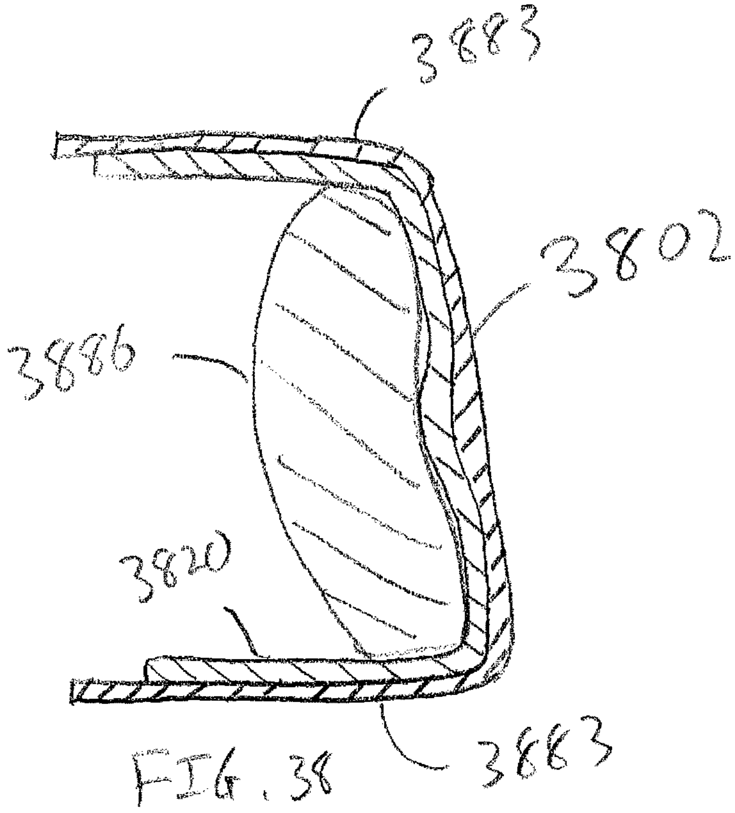
FIG. 38 shows an enlarged cross-sectional view of the striking face portion of a golf club head during the method of manufacturing.

Referring back to step 3605 shown in FIG. 36, the present invention introduces a bladder to put behind the composite material, allowing the bladder to distribute the stress more evenly across multiple surfaces. FIG. 38 illustrates the introduction of the bladder 3886 behind the one or more layers of composite face insert 3820 in its inflated state. In the current inflated state, the bladder 3886 could deform if subjected to any pressure or force, allowing it to conform to the contours of the one or more layers of composite face insert 3820 backing layer. In one exemplary embodiment of the present invention, the bladder 3886 is generally filled with an inert gas such as nitrogen or argon. However, in alternative embodiments of the present invention, the bladder 3886 may be filled with any type of fluid capable of conforming to the contours of the golf club head without departing from the scope and content of the present invention.

Figure 39:
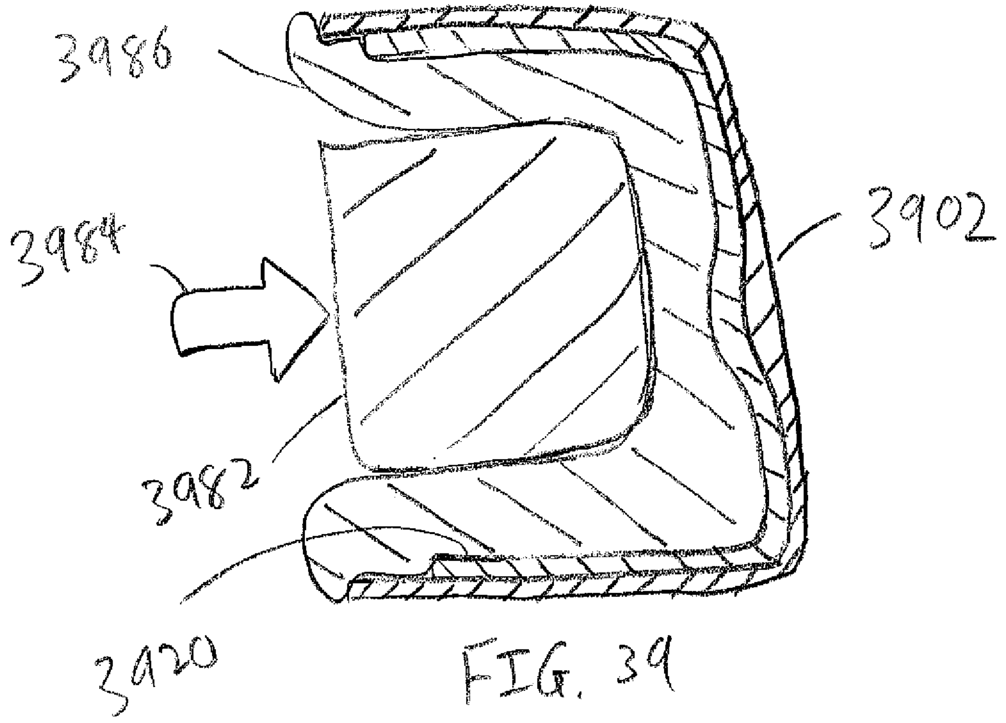
FIG. 39 shows an enlarged cross-sectional view of the striking face portion of a golf club head during the method of manufacturing.

Referring back to FIG. 36, we can see that subsequent to step 3605, step 3607 utilizes a tool to apply pressure to the bladder to cause the bladder to deform to match the contours of the internal portion of the composite material face insert. This step is illustrated more clearly in FIG. 39. FIG. 39 of the accompanying drawings shows an enlarged cross-sectional view of an intermediary step used to create the golf club head. In this step, a die 3982 is introduced by applying an axial force 3984 on the bladder 3986 itself in the direction that is perpendicular to the loft of the striking face 3902 portion. Once the die 3982 is introduced, step 3609 of FIG. 36 illustrates the final curing process and the application of hydrostatic force. The hydrostatic force actually stems from an application of axial force 3984 by the die 3982 onto the bladder 3986 instead of on the composite material face insert 3920 itself. This hydrostatic force will apply pressure in multiple directions onto the one or more layers of composite material face insert 3920, creating a stronger bond between the composite material face insert 3920 and the striking face 3902. Alternatively speaking, the bladder 3982 applies a hydrostatic force in one or more directions to said one or more layers of composite. In one preferred embodiment, the bladder 3982 allows a uniform pressure to be applied to all portions of the one or more layers of composite insert 3920; however, in alternative embodiments of the present invention multiple bladders could be used to create specific pressure at different locations of the composite insert 3920 also without departing from the scope and content of the present invention.

Figure 40:
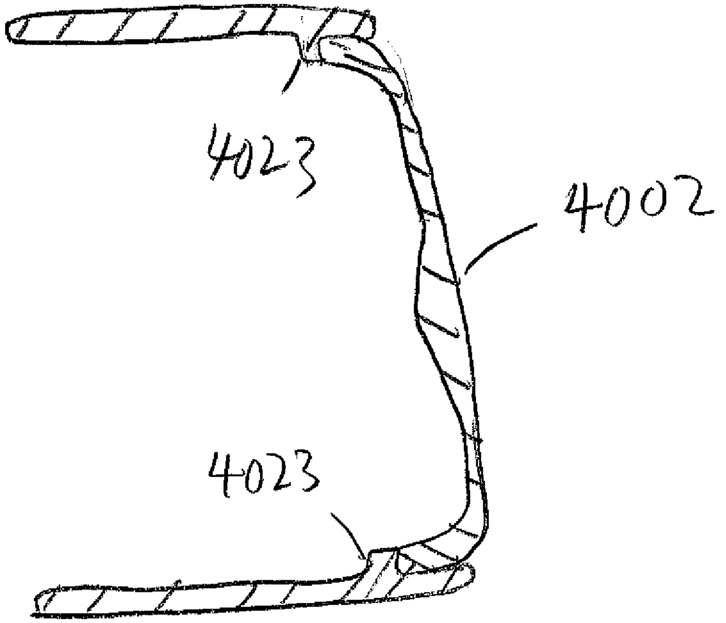
FIG. 40 shows an enlarged cross-sectional view of the striking face portion of a golf club head in accordance with the alternative embodiment of the present invention.

FIG. 40 shows an enlarged cross-sectional view of the striking face portion of a golf club head in accordance with the alternative embodiment of the present invention. In this embodiment of the present invention, the backing portion 4023 creates a backstop for the striking face portion is specific embodiment of the present invention requires the striking face portion to be attached to the body portion via a bonding process that utilizes adhesive. However, in alternative embodiments of the present invention, the bonding process could utilize a mechanical lock process, welding process, or even brazing process without departing from the scope and content of the present invention.

Figure 41:
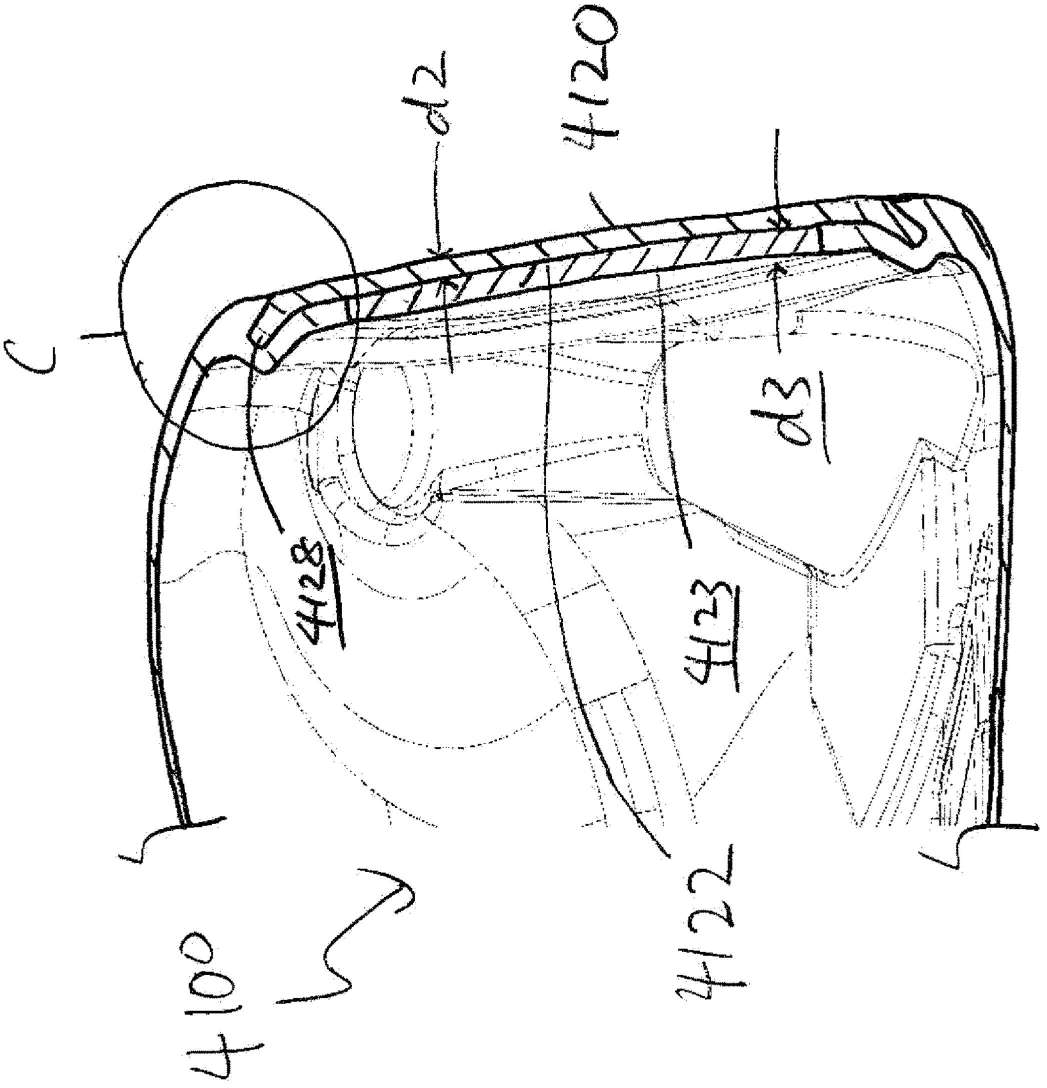
FIG. 41 shows an enlarged cross-sectional view of the striking face of a golf club head in accordance with a further alternative embodiment of the present invention.

FIG. 41 shows an enlarged cross-sectional view of circular region B shown in FIG. 4 of a golf club head in accordance with a further alternative embodiment of the present invention. In this embodiment of the present invention, we can see that the face insert 620 may generally create a dovetail type undercut 4128 around the perimeter engagement portion C between the face insert 4120 within the pocket 4122 that further enhances the bond between the two above mentioned components. However, this specific undercut differs from prior embodiments discussed in FIGS. 6, 6A, 6B, 6C, and 6D in that it has a specific shape, angle, and geometry that significantly enhances the ability of the pocket 4122 to retain the face insert 4120 without sacrificing the performance of the golf club head 4100 itself.

It should be noted here that the thickness d2 of the face insert 4120 and the thickness d3 of the backing portion 4123 are similar to the previous discussions, thus establishing a Striking Thickness Ratio also in line with the previous discussions. In summary, the thickness d2 of the face insert 4120 may generally be between 0.2 mm to about 2.0 mm, more preferably between 0.5 mm to about 1.5 mm, most preferably about 1.0 mm. The thickness d3 of the backing portion 4123 may generally be between 1.5 mm to about 3.0 mm, more preferably between about 1.75 mm to about 2.75 mm, and most preferably about 2.25 mm. Ultimately, the resultant Striking Thickness Ratio, as defined by Equation (2) above, is less than about 1.0, more preferably less than about 0.8, and most preferably less than about 0.7.

Figure 42:
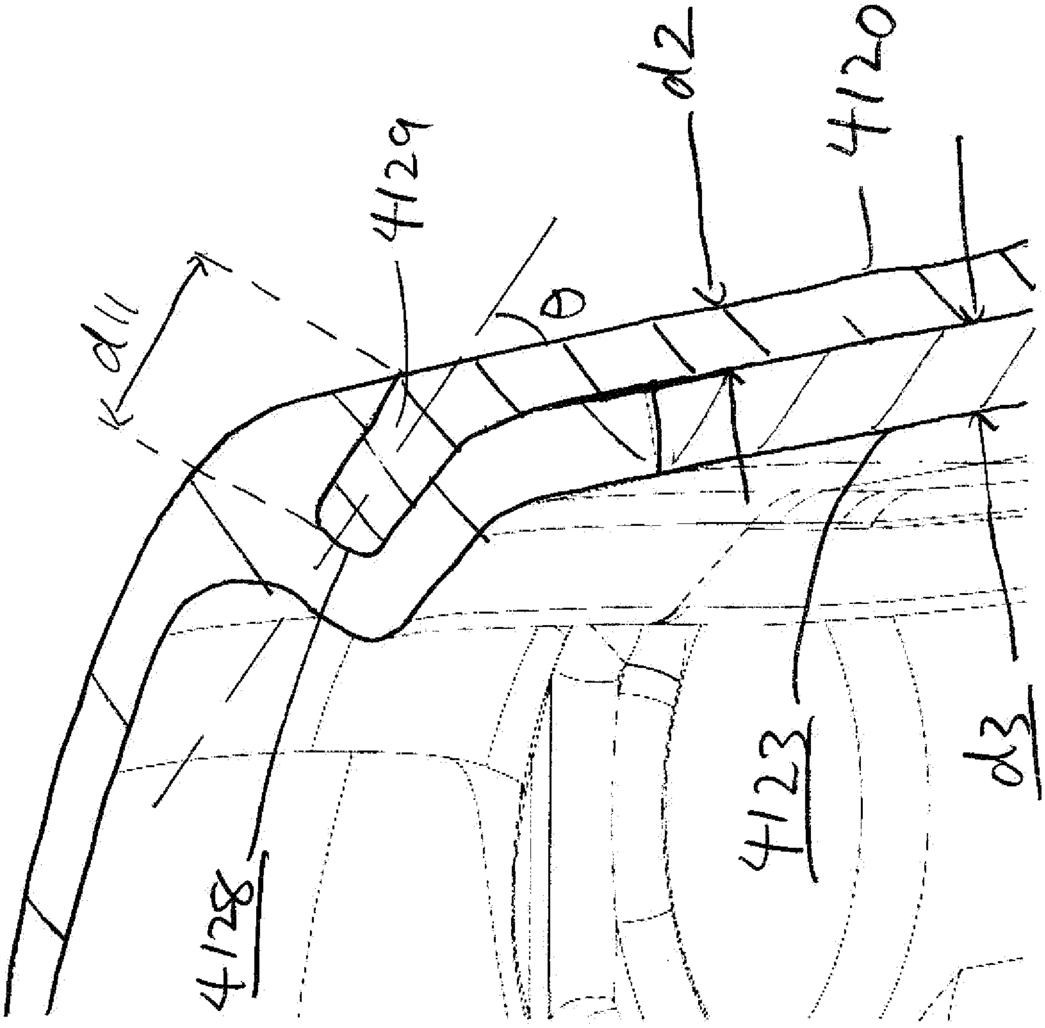
FIG. 42 shows a further enlarged cross-sectional view of the golf club head focusing on the perimeter of the pocket in accordance with a further alternative embodiment of the present invention.

Focusing on the unique dovetail type undercut 4128 feature unique to this embodiment of the present invention, FIG. 42 is provided with a further enlarged view of the dovetail type undercut 4128 by focusing on the circular region C shown in FIG. 41. Turning now to FIG. 42, we can see that in addition to the thickness d2 of the face insert 4120 and the thickness d3 of the backing portion 4123, additional features of the dovetail type undercut 4128 is shown in more detail. First and foremost, we can see that the dovetail type undercut 4128 is angled at an angle θ relative to the loft of the striking face. The angle θ of between about 40 degrees to about 65 degrees, more preferably between about 45 degrees to about 60 degrees, and most preferably between about 50 degrees to about 55 degrees. This angle θ is critical to the proper functioning of the invention because if the angle θ is too low, then the metallic material that wraps around the frontal portion of the striking face would be too thin and would be prone to failure. However, the opposite is also detrimental in that when the angle θ is too high, then the sharp angle created by the face insert 4120 makes it difficult to manufacture and could also be prone to failure.

Secondly, we can see that the depth d11 of the dovetail type undercut 4128 is measured at the previously mentioned angle θ, and depicts the depth of the dovetail type undercut 4128. Alternatively speaking, it can be said that the face insert 4120 has complimentary dovetail shaped protrusion 4129 nears its edges adapted to engage undercut 4128 to help secure the face insert 4120 to the backing portion 4123. The depth d11 of the undercut 4128 or the distance of the complimentary dovetail shaped protrusion 4129, as shown in this embodiment of the present invention, may generally be between about 3 mm to about 6 mm, more preferably between about 3.5 mm to about 5.5 mm, and most preferably between about 3.75 mm to about 5.25 mm. However, it should be noted that lengths that are outside of this range could potentially work with the present invention, but the results provided would be less than optimal.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the above specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. A golf club head comprising:

a striking face provided near a forward portion of said golf club head;

a body connected to an aft portion of said striking face further comprising a crown, a sole, and a skirt, wherein said body comprises a first material having a first density;

said striking face further comprising:

an inner portion located at an inner side of said striking face; and an outer portion located at an outer side of said striking face, wherein at least one of said inner portion and said outer portion comprises a second material having a second density, wherein said second material comprises one or more layers of composite material, wherein said composite material has a substantially linear elastic to failure characteristic, wherein said composite material has at least three adjacent layers having fibers, and wherein every fiber in each of said at least three adjacent layers is oriented in a same direction.

2. The golf club head of claim 1, wherein said composite material has a tensile strength greater than about 4.0 GPa.

3. The golf club head of claim 2, wherein said composite material has a tensile strength less than about 6.0 GPa.

4. The golf club head of claim 1, wherein said same direction is a substantially vertical direction.

5. A golf club head comprising:

a striking face provided near a forward portion of said golf club head;

a body connected to an aft portion of said striking face further comprising a crown, a sole, and a skirt, wherein said body comprises a first material having a first density;

said striking face further comprising:

an inner portion located at an inner side of said striking face; and an outer portion located at an outer side of said striking face, wherein said outer portion comprises a second material having a second density, wherein said second material comprises one or more layers of composite material, wherein said striking face is attached to said body at an outer periphery of said striking face, wherein said composite material has a strain to failure percentage of about 2.5%, and wherein said composite material comprises at least five adjacent layers having fibers oriented in a same direction.

6. The golf club head of claim 5, wherein said same direction is a substantially vertical direction.

7. The golf club head of claim 5, wherein said composite material has a substantially linear elastic to failure characteristic with a tensile strength of greater than about 4.0 GPa and less than about 6.0 GPa.

* * * * *